US012812472B2

(12) United States Patent
Ahmed

(10) Patent No.: US 12,812,472 B2
(45) Date of Patent: Nov. 24, 2026

(54) BATCH RECOMMENDATION OF RADIO NODE CLUSTERS FOR FIRMWARE SCHEDULER

(71) Applicant: Rakuten Symphony, Inc., Tokyo (JP)

(72) Inventor: Tasnim Ahmed, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 281 days.

(21) Appl. No.: 18/644,116

(22) Filed: Apr. 24, 2024

(65) Prior Publication Data

US 2025/0338175 A1 Oct. 30, 2025

(51) Int. Cl.

| | |
|---|---|
| ***H04W 4/00*** | (2018.01) |
| ***H04W 28/08*** | (2023.01) |
| ***H04W 36/22*** | (2009.01) |
| ***H04W 40/24*** | (2009.01) |

(52) U.S. Cl.

CPC ....... *H04W 28/0958* (2020.05); *H04W 36/22* (2013.01); *H04W 40/248* (2013.01)

(58) Field of Classification Search

CPC ............. H04W 28/0958; H04W 36/22; H04W 40/248

See application file for complete search history.

(56) References Cited

U.S. PATENT DOCUMENTS

2018/0255507 A1* 9/2018 Nagasaka ............. H04W 92/02

* cited by examiner

*Primary Examiner* — Omoniyi Obayanju

(74) *Attorney, Agent, or Firm* — HAUPTMAN HAM, LLP

(57) ABSTRACT

A master node list is filtered. A node is a network node configured to create, receive, or transmit information, into an isolated nodes grouping and a filtered nodes grouping based on a single-coverage threshold. For each node in the filtered nodes grouping, a priority-based sequence of compensating neighbor nodes is sequenced. Compensating neighbor nodes are prioritized in terms of compensating capacity. A collective neighbor compensation performance is determined based on an overall compensation provided by the compensating neighbor nodes for a given node that is to be shut down. Each node from the master node list is distributed into one or more batches, based on a batch criteria.

20 Claims, 11 Drawing Sheets

BATCH RECOMMENDATION OF RADIO NODE CLUSTERS FOR FIRMWARE SCHEDULER

TECHNICAL FIELD

This description relates to batch recommendation of radio node clusters for a firmware scheduler.

BACKGROUND

A radio access network (RAN) is part of a telecommunication system and implements radio access technology. RANs reside between a device, such as a mobile phone, a computer, or remotely controlled machine, and provide connection with a core network (CN). Depending on the standard, mobile phones and other wireless connected devices are varyingly known as user equipment (UE), terminal equipment (TE), mobile station (MS), and the like.

Centrally controlling networks has been shown to add value for network operators. Firmware updates are often performed periodically or based on triggers. During a firmware update, a radio node is disconnected from a network. Therefore, bulk firmware updates that are performed by randomly selecting radio-nodes, e.g., Virtualized Central Units (VCUs) or Open CUs, for a given area results in catastrophic scenarios. Examples of such catastrophic scenarios include coverage blackout, a steep drop in handover success, or the like.

SUMMARY

In some embodiments, a method includes filtering a master node list. A node is a network node configured to create, receive, or transmit information, into an isolated nodes grouping and a filtered nodes grouping based on a single-coverage threshold. For each node in the filtered nodes grouping, a priority-based sequence of compensating neighbor nodes is sequenced. Compensating neighbor nodes are prioritized in terms of compensating capacity. A collective neighbor compensation performance is determined based on an overall compensation provided by the compensating neighbor nodes for a given node that is to be shut down. Each node from the master node list is distributed into one or more batches, based on a batch criteria.

In some embodiments, an apparatus is configured to filter a master node list. A node is a network node configured to create, receive, or transmit information, into an isolated nodes grouping and a filtered nodes grouping based on a single-coverage threshold. For each node in the filtered nodes grouping, a priority-based sequence of compensating neighbor nodes is sequenced. Compensating neighbor nodes are prioritized in terms of compensating capacity. A collective neighbor compensation performance is determined based on an overall compensation provided by the compensating neighbor nodes for a given node that is to be shut down. Each node from the master node list is distributed into one or more batches, based on a batch criteria.

In some embodiments, a non-transitory computer-readable media having computer-readable instructions stored thereon, which when executed performs operations to filter a master node list. A node is a network node configured to create, receive, or transmit information, into an isolated nodes grouping and a filtered nodes grouping based on a single-coverage threshold. For each node in the filtered nodes grouping, a priority-based sequence of compensating neighbor nodes is sequenced. Compensating neighbor nodes are prioritized in terms of compensating capacity. A collective neighbor compensation performance is determined based on an overall compensation provided by the compensating neighbor nodes for a given node that is to be shut down. Each node from the master node list is distributed into one or more batches, based on a batch criteria.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
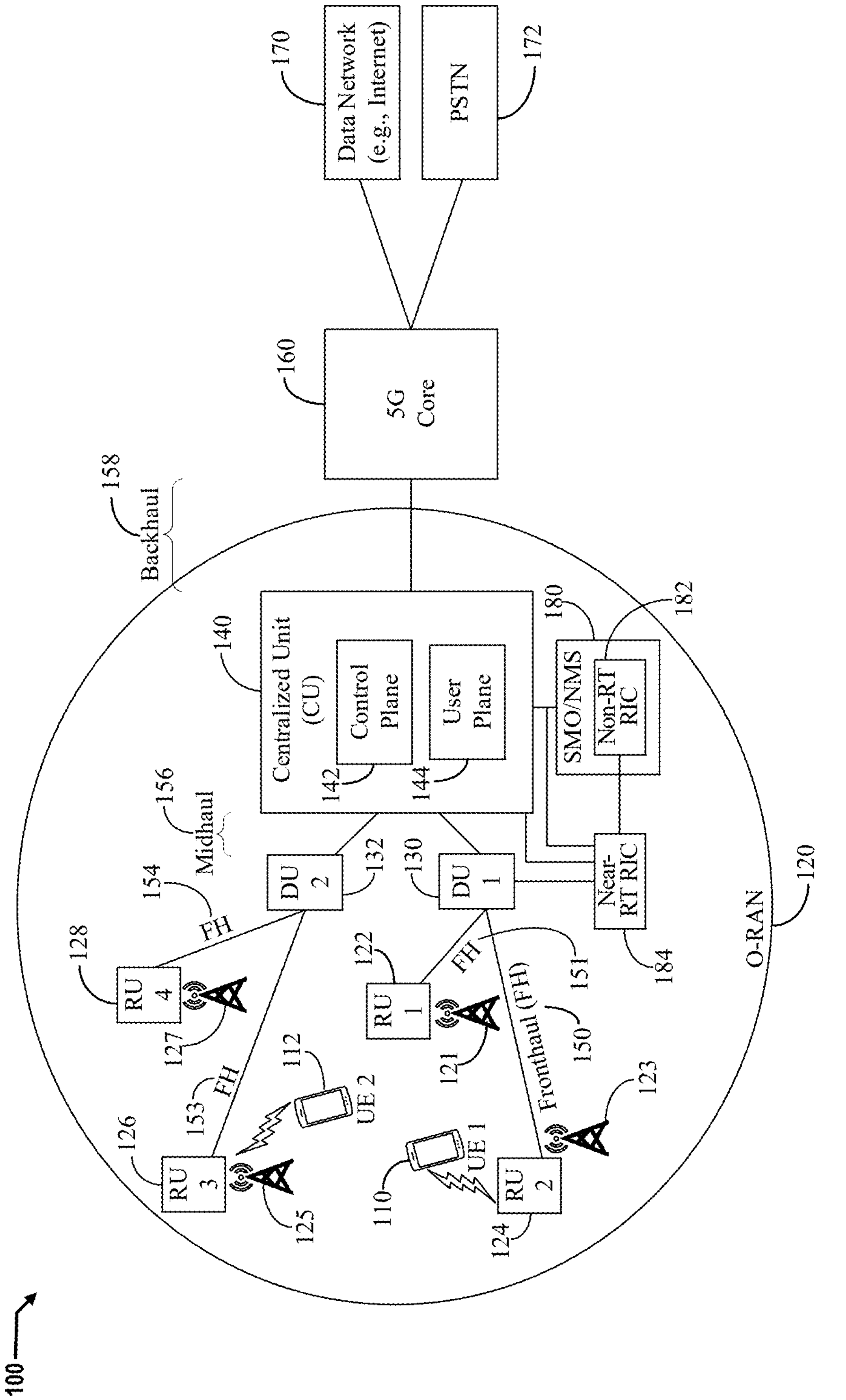
FIG. 1 is a pictorial diagram of a mobile network in accordance with some embodiments.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched, as long as these modifications may not affect the resulting scope of the invention.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming, or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB), "home access point (HAP)," "node", or the like refer to a wireless network component or apparatus that serves and receives data, control, voice, video, sound, gaming, data-streaming or signaling-streaming from a UE.

The foregoing disclosure provides illustration and description but is not intended to be exhaustive or to limit the implementations to the precise form disclosed. Modifications and variations are possible in light of the above disclosure or may be acquired from practice of the implementations.

A smart scheduler prepares for automatic bulk/batchwise radio-node software/firmware updates and other maintenance activities. Firmware is a class of computer software that provides low-level control for a device's hardware. Firmware, such as the basic input output system (BIOS) of a personal computer, contains basic functions of a device, and provides hardware abstraction services to higher-level software such as operating systems. For less complex devices, firmware acts as the device's complete operating system, performing control, monitoring, and data manipulation functions. Typical examples of devices containing firmware are embedded systems (running embedded software), home and personal-use appliances, computers, and computer peripherals. Firmware is held in non-volatile memory devices such as read-only memory (ROM), erasable programmable read-only memory (EPROM), electrically erasable programmable read-only memory (EEPROM), and flash memory. Updating firmware requires ROM integrated circuits to be physically replaced, or EPROM or flash memory to be reprogrammed through a procedure. Common reasons for updating firmware include fixing bugs or adding features.

The scheduler is able to provide advantages including reducing the impact on network coverage area by, for example, utilizing the neighboring nodes, maintaining handover success rates among radio-nodes, e.g., handover success rates close to a pre-schedule period, minimizing a reduction of internet protocol (IP) network traffic by shutting down nodes at a time when the throughput is a minimum, updating nodes while the least number of users are connected, and ensuring adequate coverage and handover support for the high priority nodes, e.g., nodes that very-important people (VIP's) or many subscribers are connected.

A smart scheduler provides automatic bulk/batchwise scheduling of software upgrades for radio nodes. During software updates or maintenance activity for the radio nodes (e.g., those nodes scheduled for an update or maintenance activity) inside a coverage area, e.g., 1000 VCUs, O-CUs, or other telecommunication devices inside an area, field engineers manually shut down one or two devices inside a small area and do not switch off other nodes close to the shutdown devices so that there is no significant impact on the consumers, e.g., no coverage blackout inside that area.

Currently there is no system that automatically resolves the issues that call for consideration. For example, knowing the coverage area affected in response to a network operator shutting down a node. Other issues include knowing what percentage of the coverage area is unavailable, whether handovers to a nearby node continue without interruption, is the IP traffic for the affected area or the uplink and downlink data traffic of the area handled by the current remaining nodes inside that area, are devices close to the effected nodes unable to be handed over to other nodes, what are the number of nodes affected, and what is the portion of the area that is affected.

The smart scheduler takes these consideration issues and automatically attempts to make a schedule of automatic software updates that are to be executed at one time. At any instance, there is always a balance. While affecting some consumers is acceptable, large-scale impact to consumers is to be avoided. The smart scheduler is to keep the impact to the system and customers significantly low or manageable. Node network coverage area affected is minimized and the handover success rate among the radio nodes is maintained, the reduction of IP network traffic is minimized by updating nodes while the least number of users are connected. A timeslot during the day is to be selected where the least number of users are connected, and adequate coverage is ensured. handover support for high priority nodes is further ensured. For example, in response to the updated node involving a crowed public place or there are VIP's at the location, e.g., hotspots. More emphasis is to be given to those points.

The smart scheduler includes a first layer for monitoring applications such as radio nodes, e.g., node coverage monitors and radio node status monitors. A layer is a generalization of a conceptual model or algorithm, away from any implementation. These generalizations arise from broad similarities that are encapsulated by models that express similarities present in various implementations. The simplification provided by a good abstraction layer allows for easy reuse by distilling a useful concept or design pattern so that situations where applying accurately the useful concept or design pattern are quickly recognized. A layer is on top of another in response to the layer depending on the other. Each layer exists without the layers above, and calls for the layers below the layer to function.

Information is collected from the coverage monitor, such as the coverage information and handover information. The status monitor collects connected subscriber count and traffic statistics. Collected node data and clustering parameters are useable to perform node clustering operations. The clustering operation handles the clustering of the radio nodes in a particular area in a way that each batch is to be shut down at once without significant impact, such as causing a coverage area blackout or other service issue. The nodes that are to be shutdown are identified and clustered together.

The node clustering operations involve a batch recommendation algorithm that determines a neighbor of each node for compensation based on coverage, handover, and hotspots. Neighbor sequencing is performed to prioritize gain in collective coverage. The smart scheduler is configured to use artificial intelligence (AI) to reduce the impact on network coverage, handover success, IP network traffic, and connected subscribers. For example, AI is used for sequencing neighbor nodes for choosing the compensator (neighbor) node. In response to a node shutting down, compensating neighbor nodes that are close and capable of minimizing that shutdown are identified. AI ranks the neighbors in terms of their compensating capacity. The clustering operation performs agglomerative hierarchical clustering based on an unsupervised machine learning (ML) algorithm to select compensating neighboring nodes for nodes shut down during the firmware upgrade and provide maximum coverage and handover.

Hierarchical clustering (also called hierarchical cluster analysis or HCA) is a method of cluster analysis that seeks to build a hierarchy of clusters. Agglomerative is a "bottom-up" approach where each observation starts in its own cluster, and pairs of clusters are merged as one moves up the hierarchy. Unsupervised learning is a type of algorithm that learns patterns from untagged data. Through mimicry a machine is forced to build a concise representation of its world and then generate imaginative content. In contrast to supervised learning where data is tagged by an expert, unsupervised methods exhibit self-organization that captures patterns as probability densities or a combination of neural feature preferences encoded in the machine's weights and activations. The other levels in the supervision spectrum are reinforcement learning where the machine is given only a numerical performance score as guidance, and semi-supervised learning where a small portion of the data is tagged.

The neighbor sequencing receives a node list, identifies neighbor nodes to each node, and sequences or sorts neighbor nodes according to a combined coverage capacity. Net collective coverage ratio, average handover success rate, and total handover attempt ratio are determined. Estimates for determining collective neighbor compensation are performed using the net collective coverage ratio, average handover success rate, and total handover attempt ratio. The collective neighbor compensation is based on a weighted average of the net collective coverage ratio, average handover success rate, and total handover attempt ratio, wherein the collective coverage ratio is weighted at 70%, the average handover success rate is weighted at 20%, and the handover attempt ratio is weighted at 10%. A compensation risk is determined based on the collective neighbor compensation. Batch distribution is performed to identify a batch of source nodes for updating the firmware based on the compensation risk. For purposes of the following discussion, a source node is a radio node that is to be shut down for a predetermined amount of time to perform a firmware or software update. A neighbor or compensating node is a radio node providing coverage support during the time the source node is shut down.

In some embodiments, node clustering operations involve use of a batch recommendation algorithm to choose a neighbor node for compensation of a node, which is undergoing a firmware update, based on coverage, handover, and hotspots. Neighbor Sequencing is performed to prioritize gain in collective coverage.

In some embodiments, a node that is to have a firmware update is identified, neighbor nodes are identified, and neighbor nodes are sequenced or sorted according to a combined coverage capacity. Net collective coverage ratio, average handover success rate, and a total handover attempt ratio are determined. Estimates for determining collective neighbor compensation are performed using the net collective coverage ratio, average handover success rate, and total handover attempt ratio. The collective neighbor compensation is based on a weighted average of the net collective coverage ratio, average handover success rate, and total handover attempt ratio, wherein the coverage ratio is weighted at 70%, the average handover success rate is weighted at 20%, and the handover attempt ratio is weighted at 10%. A compensation risk is determined based on the collective neighbor compensation. Batch distribution is performed to identify a batch of nodes for updating the firmware based on the compensation risk.

In a non-limiting example, a batch recommendation algorithm begins by receiving a list of nodes that are to receive a firmware or software update. The list of nodes is filtered based upon a single coverage threshold received as a user input. The single coverage threshold is the minimum single coverage for a radio node to consider the node as isolated. Thus, in response to the single coverage threshold being 80%, then the filter separates the node list into isolated nodes (single coverage above threshold) and filtered nodes (single coverage below threshold) to separate nodes that have over 80% coverage by a single neighboring node and nodes that do not have over 80% coverage by a single neighboring node.

In some embodiments, the isolated nodes are forwarded to a batch distribution algorithm. The filtered nodes are forwarded to a neighboring sequencing algorithm. Sequencing criteria are used to control the sequencing operation. Neighbor nodes are prioritized in terms of compensation capacity, which means coverage, handover, handover success, and total handover attempts. handover attempts are the number of times a call has been forwarded from that node to neighbor nodes and the handover success rate is a measure of how many times that neighbor nodes have successfully received those forwarded calls.

In some embodiments, a compensation capacity-based sequence of neighbor nodes is pre-calculated for use as a knowledge base for a batch splitting operation. Once a new node is added to the network, corresponding neighbor node assessment is added to the knowledge base. This is treated as an isolated task that does not affect the batch-splitting pipeline, which uses the latest knowledge-base.

In some embodiments, neighbor nodes are sequenced by three parameters: coverage, handover success rate, and total handover attempts.

In some embodiments, there are two formulas for neighbors sequencing.

In some embodiments, formula 1 sequences neighbor nodes based on a gain in collective coverage. Formula 1 sequences neighbor nodes with ML. These two formulas are combined according to two methods to create a neighbor sequencing operation.

In some embodiments, according to formula 1, there are two scenarios. The first scenario (scenario A) is where the neighbor sequence is not given. The second scenario (scenario B) is where the neighbor sequence is given.

In some embodiments, in scenario A of the formula 1, a neighbor node with a maximum coverage capacity is identified. Then the remaining neighbor nodes are looped through to sequence by coverage capacity. A neighbor node that maximizes the gain in collective coverage is selected. The coverage gain is the collective coverage minus the coverage of the neighbor, which is the additional neighbor nodes that were added to the collection. A neighbor node having the most gain in the collective coverage is added, and the process loops through the remaining neighbor nodes until all the neighbor nodes have been considered. To calculate the gain in collective coverage, the collective coverage is estimated using the geo coverage map.

In some embodiments, in scenario B of formula 1, the gain in collective coverage is determined, and then the neighbor nodes, which have a collective gain greater than a certain threshold, are re-sequenced in descending order by the gain in collective coverage.

In some embodiments, formula 2 is based on ML that uses an agglomerative hierarchical clustering algorithm. First, the neighbor nodes are clustered based on the first priority parameter, e.g., coverage is the highest priority, second is handover success rate, and next is handover attempts. Thus, a hierarchy of priorities for the parameters is used.

In some embodiments, the neighbor nodes which have very close coverage performance are clustered. In each of these clusters, the neighbor nodes are re-clustered again based on handover success rate. Inside the second level clusters, the neighbor nodes are sequenced by handover attempts.

In some embodiments, two methods for sequencing neighbor nodes using formula 1 and formula 2.

In some embodiments, the first method for sequencing neighbor nodes continues to sort or sequence neighbor nodes using the first formula scenario 1, which loops through the neighbor nodes to determine the one that has the highest collective gain. In response to the collective gain being greater than a certain threshold, then the method continues to loop through the neighbor nodes. In response to the collective gain not being greater than the certain threshold, then the ML is applied for the sequencing of the remaining neighbor nodes. The first neighbor nodes are used to determine which neighbor nodes maximize the coverage gain. However, in response to the gain starting to decrease, then there is no need to loop through the remaining neighbor nodes. Instead, ML is applied to sort the remaining neighbor nodes.

In some embodiments, the second method starts by sorting neighbor nodes using ML. Then, formula 1 is applied based on scenario B, i.e., the neighbor sequence is given, to calculate the collective coverage for every neighbor node and then re-sequence based on the gain in collective coverage.

In some embodiments, after the neighbor sequencing algorithm, the batch recommendation algorithm proceeds to priority-wise sequence of neighbors for each node. After prioritization, the neighbors are sent to a neighbor compensation estimating algorithm.

In some embodiments, the priority-wise sequence of neighbor nodes for each source node is provided. Pair per source, prioritized hotspots, hotspot count, and a compensation risk threshold entered by a user at a user interface (UI). Pair per source refers to the maximum number of compensators for a source node.

In some embodiments, in response to there not being hotspots to prioritize, the neighbor nodes are reduced so that the neighbor count is ≤pair per source. In response to there being hotspots to prioritize, the neighbor nodes are reduced so that the neighbor count is ≤(pair per source+hotspot count). For example, more than three neighbor nodes are unable to be used for a node. In response to the node including 2 hotspots, two additional neighbor nodes for a total of a maximum of 5 neighbor nodes are able to be included. Next, the list of neighbor nodes is filtered.

In some embodiments, the compensation estimator is then used to determine the compensation risk for neighbor nodes of nodes being shut down. The compensation estimator first calculates collective coverage ratios by neighbor nodes. The collective coverage ratios are the percentage (%) of the total coverable area of the source node that is collectively covered by the selected neighbor nodes. The collective coverage ratios are equal to:

$$\text{Collective coverage ratio} = \frac{(\text{Source Node Area} - \text{Single Coverage Area})}{\text{Collective Coverage Area}},$$

wherein the node area is the total coverage area of the node, the single coverage area is the portion of the node coverage area that has not been overlapped by any other neighbor node, and the collective coverage area is the portion of the node coverage area that has been overlapped by other neighbor nodes.

In some embodiments, next, an average handover success (HOS) ratio is determined. The average HOS ratio is the average of the HOS ratios of all neighbor nodes.

In some embodiments, next, the handover attempt ratio is determined. The handover attempt ratio is equal to:

$$\text{Handover attempt ratio} = \frac{\text{Total Handover Attempts by the selected Neighbor Node}}{\text{Total Handover Attempts by all Neighbor Node}}.$$

In some embodiments, then, the collective neighbor compensation is determined. The collective neighbor compensation is represented by the weighted average of the three different ratios, i.e., neighbor performance indicators: net collective ratio (70%, average handover success ratio (20%), and handover attempt ratio (10%). The purpose of the neighbor compensation calculation is to represent neighbor performance indicators through one single parameter. The weights are able to be adjusted in the UI.

In some embodiments, the compensation risk=1−collective Neighbor compensation.

In some embodiments, selected neighbor nodes for each node are provided for batch distribution determination. Node-wise neighbor compensation performance is also provided for consideration. Accordingly, the smart scheduler is able to provide uniform batch distribution based on the collective neighbor compensation and compensation risk determinations.

In some embodiments, the neighbor compensation estimating algorithm outputs the selected neighbors for each node and the node-wise neighbor compensation performance. The selected neighbors are sent to a batch distribution algorithm.

In some embodiments, a set of radio nodes are to satisfy criteria before being grouped in a batch. A batch are nodes that do not directly interfere with each other. Thus, the batch nodes are not direct neighbors. The batch nodes are able to be shut down/upgraded together and the neighbor nodes function as compensators for the down or upgrading node. Therefore, a node and corresponding neighbor nodes are unable to be shut down together. Batch criteria ensure a node and neighboring node are not shut down together. The batch criteria includes (1) a node is unable to be in multiple batches; (2) one node is unable to be usable as both node and neighbor (to other nodes) within the same batch (and therefore at the same time); and (3) one neighbor compensates for a user-set number of nodes (based on user input compensator repetition). This is a precautionary measure to prevent a neighbor being overwhelmed by compensating for too many nodes.

In some embodiments, a user is able to input a compensator repetition count, which is the maximum number of nodes a neighbor is able to support simultaneously. For example, in response to trying to shut down two source nodes at the same time and there is one compensator that is trying to compensate for both source nodes, the compensatory repetition count determines what is the limit for allowing this operation.

In some embodiments, a user is able to input a compensator repeat priority at user input 368 (FIG. 3), which is the impact ratio of compensator repetition in the overall compensation risk score. A compensator that is used for compensating for multiple nodes at the same time raises a risk of an overload with handovers. Compensator repeat priority sets a priority limit to use while calculating the compensation risk.

In some embodiments, a user is able to input a uniform batch distribution, which is used to ensure near uniform distribution of compensator nodes and isolated nodes across the batches. By uniform batch distribution, a near equal number of nodes is included in each batch. In response to shutting down uniform batch distribution, one batch is able to have more nodes than another batch and the performance of each batch is not the same.

In some embodiments, a batch distribution algorithm ensures uniform distribution of nodes across batches. The batch criteria ensure that proper batch-distribution is being fulfilled.

In some embodiments, after a batch distribution operation, the recommended number of primary batches (system-recommended batches after the batch-distribution operation) are presented. However, a batch number is able to be changed by the user. In response to a batch number being increased, primary batches are sliced into halves until the target number of secondary batches (based on user input) is reached. Smaller batches (results in larger batch counts) ensure more reliable scheduling operations. Nevertheless, reducing the number of batches risks failing the third condition of the batch criteria. Reducing the number of batches increases the neighbor repeat ratio and therefore increases the risk of a neighbor being overwhelmed by compensating for too many nodes.

In a non-limiting example, a batch distribution algorithm begins by selecting a radio node. The algorithm proceeds by creating a new batch and assigns the radio node to the new batch. The algorithm then determines whether there are any remaining nodes. In response to no remaining nodes, the algorithm ends. In response to nodes remaining, the algorithm proceeds to select the next node. The algorithm determines whether the smallest batch is compatible with the next node based on the batch criteria. In response to the smallest batch being compatible, the algorithm returns to a prior operation and assigns the next node to the smallest batch. In response to the next node not being compatible with the smallest batch, the algorithm proceeds to determine whether there are any other remaining batches. In response to no other remaining batches, the algorithm returns to a prior operation and creates a new batch for the next node. In response to there being remaining batches, the algorithm returns to a prior operation and determines whether the smallest batch, of the remaining batches, is compatible with the next node and the iterative process continues.

In some embodiments, batch distribution is performed to identify a batch of nodes for updating the firmware based on the compensation risk.

In some embodiments, the output of the batch distribution algorithm is a recommended batch distribution which is aggregated based on the node-wise neighbor compensation performance of the neighbor compensation estimating algorithm. The aggregator outputs a batchwise neighbor compensation performance and an overall compensation performance.

FIG. 1 illustrates a mobile network 100 in accordance with some embodiments.

In FIG. 1, UE 1 (User Equipment 1) 110 and UE 2 112 access Mobile Network 100 via an Open Radio Access Network (RAN) 120.

O-RAN 120 includes Radio Towers 121, 123, 125, and 127. Radio Towers 121, 123, 125, 127 are associated with RU (Radio Unit) 1 122, RU 2 124, RU 3 126, and RU 4 128, respectively.

RU 1 122, RU 2 124, RU 3 126, RU 4 128 handle the Digital Front End (DFE) and the parts of the PHY layer, as well as the digital beamforming functionality. RU 1 122 and RU 2 124 are associated with Distributed Unit (DU) 1 130, and RU 3 126 and RU 4 128 are associated with DU 2 132. DU 1 130 and DU 2 132 are responsible for real time Layer 1 and Layer 2 scheduling functions. For example, in 5G, Layer-1 is the Physical Layer, Layer-2 includes the Media Access Control (MAC), Radio link control (RLC), and Packet Data Convergence Protocol (PDCP) layers, and Layer-3 (Network Layer) is the Radio Resource Control (RRC) layer. Layer 2 is the data link or protocol layer that defines how data packets are encoded and decoded, how data is to be transferred between adjacent network nodes. Layer 3 is the network routing layer and defines how data moves across the physical network.

DU 1 130 is coupled to the RU 1 122 and RU 2 124, and DU 2 132 is coupled to RU 3 126 and RU 4 128. DU 1 130 and DU 2 132 run the RLC, MAC, and parts of the PHY layer. DU 1 130 and DU 2 132 include a subset of the eNB/gNB functions, depending on the functional split option, and operation of DU 1 130 and DU 2 132 are controlled by Centralized Unit (CU) 140. CU 140 is responsible for non-real time, higher L2 and L3. Server and relevant software for CU 140 is hosted at a site or is hosted in an edge cloud (datacenter or central office) depending on transport availability and the interface for the Fronthaul connections 150, 151, 153, 154. The server and relevant software of CU 140 is further co-located at DU 1 130 or DU 2 132 or is hosted in a regional cloud data center.

CU 140 handles the RRC and PDCP layers. The gNB includes CU 140 and one or more DUs, e.g., DU 1 130, connected to CU 140 via Fs-C and Fs-U interfaces for a Control Plane (CP) 142 and User Plane (UP) 144, respectively. CU 140 with multiple DUs, e.g., DU 1 130, and DU 2 132, support multiple gNBs. The split architecture enables a 5G network to utilize different distribution of protocol stacks between CU 140, and DU 1 130 and DU 2 132, depending on network design and availability of the Midhaul 156. While two connections are shown between CU 140 and DU 1 130 and DU 2 132, CU 140 implements additional connections to other DUs. CU 140, in 5G, implements, for example, 256 endpoints or DUs. CU 140 supports the gNB functions such as transfer of user data, mobility control, RAN sharing (MORAN), positioning, session management, and the like. However, one or more functions are allocated to the DU. CU 140 controls the operation of DU 130 and DU 132 over the Midhaul interface 156.

Backhaul 158 connects the 4G/5G Core 160 to the CU 140. In some embodiments, core 160 is, for example, up to 200 km away from the CU 140. Core 160 provides access to voice and data networks, such as Internet 170 and Public Switched Telephone Network (PSTN) 172.

In some embodiments, O-RAN 120 implements beamforming that allows for directional transmission or reception. 5G beamforming enables 5G connections to be more focused toward a receiving device. O-RAN 120 is further able to implement MIMO (Multiple Input Multiple Output), including mMIMO (massive MIMO), to provide an increase in throughput and signal-to-noise ratio (SNR). MIMO improves the radio link by using the multiple paths over which signals travel from the transmitter to the receiver. The multiple paths are de-correlated and this provides the opportunity to send multiple data streams over them.

Massive MIMO and dense small cell deployments are being implemented to improve radio resource efficiency. However, the intra-cell interference from neighboring cells presents a serious problem. According to some embodiments, the modeling of interference patterns in a Massive MIMO deployment is used to identify interfering beams between different sectors so that interference optimization techniques are able to be applied to address interference.

According to some embodiments, a northbound platform for the network is provided, such as a Service Management and Orchestration (SMO)/NMS 180. SMO 180 oversees the orchestration aspects, and the management and automation of RAN elements. SMO 180 supports O1, A1 and O2 interfaces. Non-RT RIC (non-Real-Time RAN Intelligent Controller) 182 enables non-real-time control and optimization of RAN elements and resources, AI/ML workflow including model training and updates, and policy-based guidance of applications/features in Near-RT RIC 184. Near-RT RIC 184 enables near-real-time control and optimization of O-RAN elements and resources via fine-grained data collection and actions over the E2 interface. Near-RT RIC 184 includes interpretation and enforcement of policies from Non-RT RIC 182, and supports enrichment information to optimize control function.

Near-RT RIC 184 obtains information associated with the beams that is passed to Non-RT RIC 182 and processed, for example, by an rApp at the Non-RT RIC 182, to generate an interference matrix. xApps are hosted on the Near-RT RIC 184 and are useable to optimize radio spectrum efficiency. rApps are specialized microservices operating on the Non-RT RIC 182. xApps and rApps provide control and management features and functionality.

AI-Based Network Management is able to be provided at the 5G Edge via the rApps in the Non-RT RIC 182. Data is collected by a Node, such as an O-CU 140. Collected Data is processed. The ML Model at the Non-RT RIC 182 is Trained/Optimized using the processed data from the database. By implementing AI-Based Network Management at the 5G EDGE, performance is adjusted through continuous learning, and failures are handled by model monitoring. Uses cases include one or more of anomaly detection, traffic classification, network slicing, mitigation of interference between beams or antennas, or between neighboring cell sites, control of electromagnetic emissions, prediction of user and traffic distribution patterns, derivation of the optimal configuration of massive MIMO parameters of cells or beams, maximization of RAN sharing, maintenance of efficient operation through performance diagnostics, assurance of end-to-end Service level Agreements (SLAs), and the like.

Figure 2:
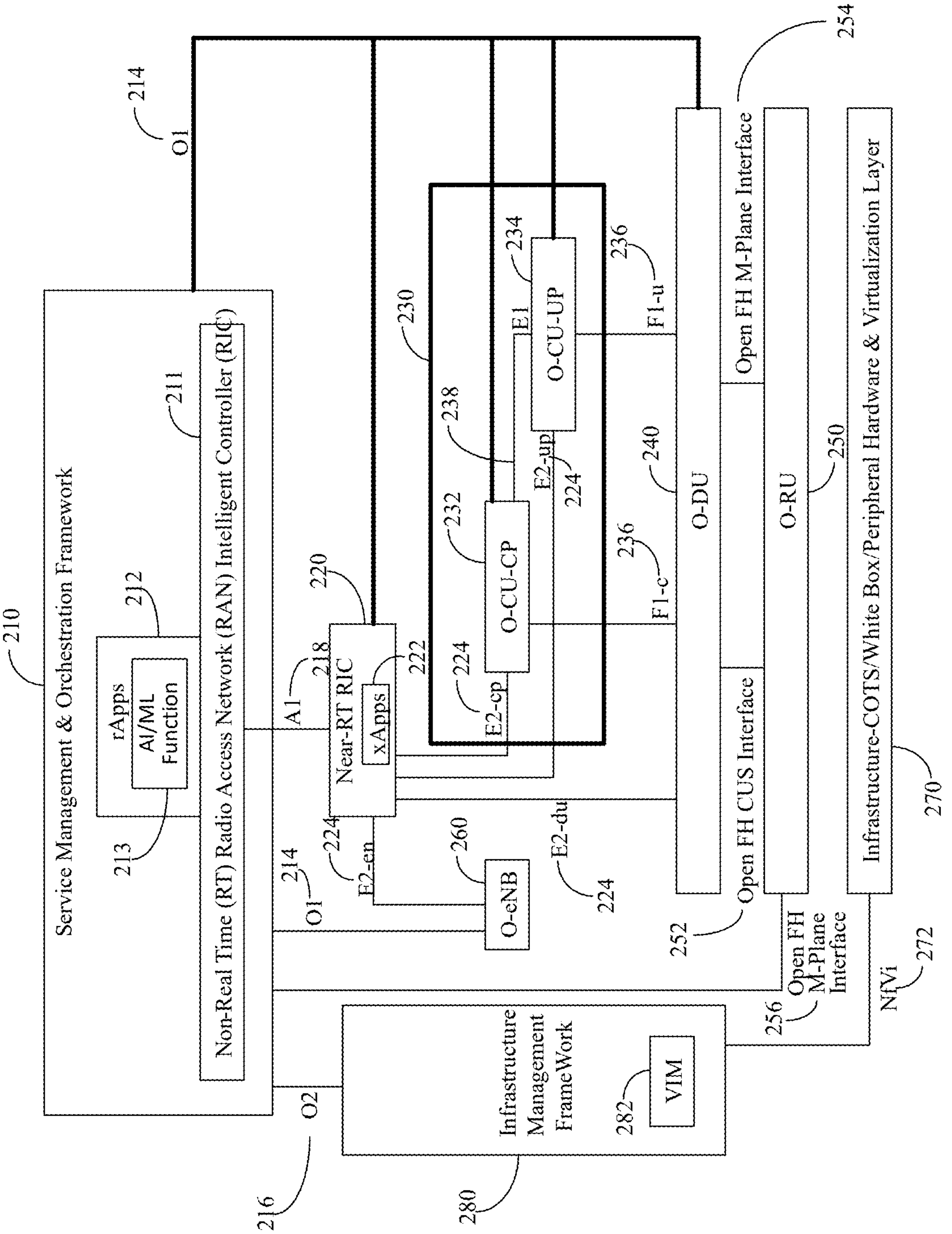
FIG. 2 is a block diagram of an Open Radio Access Network (O-RAN) according to some embodiments.

FIG. 2 is a block diagram of an Open Radio Access Network (O-RAN) 200 according to some embodiments.

In FIG. 2, Service Management and Orchestration (SMO) Framework 210 is an automation platform for Open RAN Radio Resources. SMO 210 oversees lifecycle management of network functions as well as O-Cloud. SMO 210 includes a Non-Real-Time (RT) Radio Access Network (RAN) Intelligent Controller (RIC) 211. SMO 210 further defines various SMO interfaces, such as the O1 214, O2 216, and A1 218 interfaces.

The A1 interface 218 enables communication between the Non-RT RIC 211 and a Near-RT RIC 220 and supports policy management, data transfer, and ML management. The A1 interface 218 is further used for policy guidance. SMO 210 provides fine-grained policy guidance such as getting User-Equipment to change frequency, and other data enrichments to RAN functions over the A1 interface 218.

The O1 214 interface connects the SMO 210 to the RAN managed elements, which include the Near-RT RIC 220, O-RAN Centralized Unit (O-CU) 230, O-RAN Distributed Unit (O-DU) 240, and the Open Evolved NodeB (O-eNB) 260. The management and orchestration functions are received by the managed elements via the O1 interface 214. The SMO 210 in turn receives data from the managed elements via the O1 interface 214 for AI model training at the Non-RT RIC 211. The O1 interface 214 is further used for managing the operation and maintenance (OAM) of multi-vendor Open RAN functions including fault, configuration, accounting, performance and security management, software management, and file management capabilities.

The O2 interface 216 is used to support cloud infrastructure management and deployment operations with O-Cloud infrastructure that hosts the Open RAN functions in the network. The O2 interface 216 supports orchestration of O-Cloud infrastructure resource management (e.g., inventory, monitoring, provisioning, software management and lifecycle management) and deployment of the Open RAN network functions, providing logical services for managing the lifecycle of deployments that use cloud resources.

SMO 210 provides a common data collection platform for management of RAN data as well as mediation for the O1 214, O2 216, and A1 218 interfaces. Licensing, access control and AI/ML lifecycle management are supported by the SMO 210, together with legacy north-bound interfaces.

SMO 210 further supports existing OSS functions, such as service orchestration, inventory, topology, and policy control.

The Non-RT RIC 211 enables non-real-time (>1 second) control of RAN elements and their resources through cloud-native microservice-based applications, which are referred to as rApps 212. An rApp 212 implements an AI/ML Function 213. Non-RT RIC 211 communicates with applications called xApps 222 running on a Near-RT RIC 211 to provide policy-based guidance for edge control of RAN elements and their resources. The Non-RT RIC 211 provides non-real-time control and optimization of RAN elements and resources, AI/ML workflow, including model training of the AI/ML Function 213, updates, and policy-based guidance of applications/features in Near-RT RIC 220.

Near-RT RIC 220 controls RAN infrastructure at the cloud edge. Near-RT RIC 220 controls RAN elements and resources with optimization actions that typically take 10 milliseconds to one second to complete. The Near-RT RIC 220 receives policy guidance from the Non-RT RIC 211 and provides policy feedback to the Non-RT RIC 211 through the xApps 222.

The xApps 222 are used to enhance the RAN's spectrum efficiency. The Near-RT RIC 220 manages a distributed collection of "southbound" RAN functions, and further provides "northbound" interfaces for operators: the O1 214 and A1 218 interfaces to the non-RT RIC 211 for the management and optimization of the RAN. The Near-RT RIC 220 is thus able to self-optimize across different RAN types, like macros, Massive MIMO, and small cells, maximizing network resource utilization for 5G network scaling.

Within the Near-RT RIC 220, the xApps 222 communicate via defined interface channels. An internal messaging infrastructure provides the framework to handle conflict mitigation, subscription management, app lifecycle management functions, and security. Data transfers are implemented via the E2 interface.

The O-RAN is split into a Central Unit (CU) 230, a Distributed Unit (DU) 240, and a Radio Unit (RU) 250. The CU 230 is further split into two logical components, one for the Control Plane (CP) 232, and one for the User Plane (UP) 234. The logical split of the CU 230 into the CP 232 and UP 234 allows different functionalities to be deployed at different locations of the network, as well as on different hardware platforms. For example, CUs 230 and DUs 240 can be virtualized on white box servers at the edge, while the RUs 250 are implemented on Field Programmable Gate Arrays (FPGAs) and Application-specific Integrated Circuits (ASICs) boards and deployed close to RF antennas.

The O-RAN Distributed Unit (O-DU) 240 is an edge server that includes baseband processing and radio frequency (RF) functions. The O-DU 240 hosts radio link control (RLC), MAC, and a physical layer with network function virtualization or containers. O-DU 240 supports one or more cells, and the O-DUs are able to support one or more beams to provide the operating support for O-RU 250 by CUS (Control, User, and Synchronization) planes 252, and management (M) planes 254 through front-haul interfaces.

The O-RU 250 processes radio frequencies received by the physical layer of the network. The processed radio frequencies are sent to the O-DU 240 through fronthaul interfaces 252, 254. The O-RU 250 hosts the lower PHY Layer Baseband Processing and RF Front End (RF FE) and is designed to support multiple 3GPP split options.

An Open-Evolved Node B (O-eNB) 260 provides the hardware aspect of the O-RAN. The management and orchestration functions are received by the managed elements via the O1 interface 214. The SMO 210 in turn receives data from the managed elements via the O1 interface 214 for AI model training of AI/ML Functions 213 implemented by rApps 212 at non-RT RIC 211. The O-eNB 260 communicates with the Near-RT RIC 220 via the E2 interface 224. E2 224 enables near-real-time loops through the streaming of telemetry from the RAN and the feedback with control from the Near-RT RIC 220. The E2 interface 224 connects the Near-RT RIC 220 with an E2 node, such as the O-CU-CP 232, O-CU-UP 234, the O-DU 240, and the O-eNB 260. An E2 node is connected to one Near-RT RIC 220, while a Near-RT RIC is connected to multiple E2 nodes. The protocols over the E2 interface 224 are based on the control plane and supports services and functions of Near-RT RIC 220.

An F1 Interface 236 connects the O-CU-CP 232 and the O-CU-UP 234 to the O-DU 240. Thus, the F1 interface 236 is broken into control and user plane subtypes and exchanges data about the frequency resource sharing and other network statuses. One O-CU 230 can communicate with multiple O-DUs 240 via F1 interfaces 236.

An E1 238 interface connects the O-CU-CP 232 and the O-CU-UP 234. The E1 Interface 238 is used to transfer configuration data and capacity information between the O-CU-CP 232 and the O-CU-UP 234. The configuration data ensures the O-CU-CP 232 and the O-CU-UP 234 interoperate. The capacity information is sent from the O-CU-UP 234 to the O-CU-CP 232 and includes the status of the O-CU-UP 234.

The O-DU 240 communicates with the O-RU 250 via an Open Fronthaul (FH) Control, User, and Synchronization (CUS) Plane Interface 252 and an M-Plane (Management Plane) Interface 254. As part of the CUS Plane Interface 252, the C-Plane (control plane) is a frame format that carries data in real-time control messages between the O-DU 240 and O-RU 250 for use to control user data scheduling, beamforming weight selection, numerology selection, and the like. Control messages are sent separately for downlink (DL)-related commands and uplink (UL)-related commands.

The U-Plane carries the user data messages between the O-DU 240 and O-RU 250, such as the in-phase and quadrature-phase (IQ) sample sequence of the orthogonal frequency division multiplexing (OFDM) signal. The S-plane includes synchronization messages used for timing synchronization between O-DU 240 and O-RU 250. The Control and User Plane are further useable to send information specifying beamforming weights from the O-DU 240 to O-RU 250. Other information includes time resource and frequency resource information.

The M-Plane 254 connects the O-RU 250 to the O-DU 240, and an optional M-Plane 256 connects the O-RU 250 to the SMO 210. The O-DU 240 uses the M-Plane 254 to manage the O-RU 250, while the SMO 210 provides FCAPS (Fault, Configuration, Accounting, Performance, Security) services to the O-RU 250. The M-plane 254 supports the management features including startup installation, software management, configuration management, performance management, fault management and file management.

The M-Plane 254 is used by the O-DU 240 to retrieve the capabilities of the O-RU 250 and to send relevant configuration related to the C-Plane and U-Plane (data plane) to the O-RU 250. Together the O1 214 and Open-Fronthaul M-plane 254 interfaces provide a FCAPS interface with configuration, reconfiguration, registration, security, performance, monitoring aspects exchange with individual nodes, such as O-CU-CP 232, O-CU-UP 234, O-DU 240, and O-RU 250, as well as non-RT RIC 220.

Infrastructure-COTS/White Box/Peripheral Hardware & Virtualization Layer 270 connects to Infrastructure Management Framework 280 via Network Function Virtualization Interface (NFVI) 272. Virtualized Infrastructure Manager (VIM) 282 at Infrastructure Management Framework 280 controls and manages virtual network functions.

Figure 3:
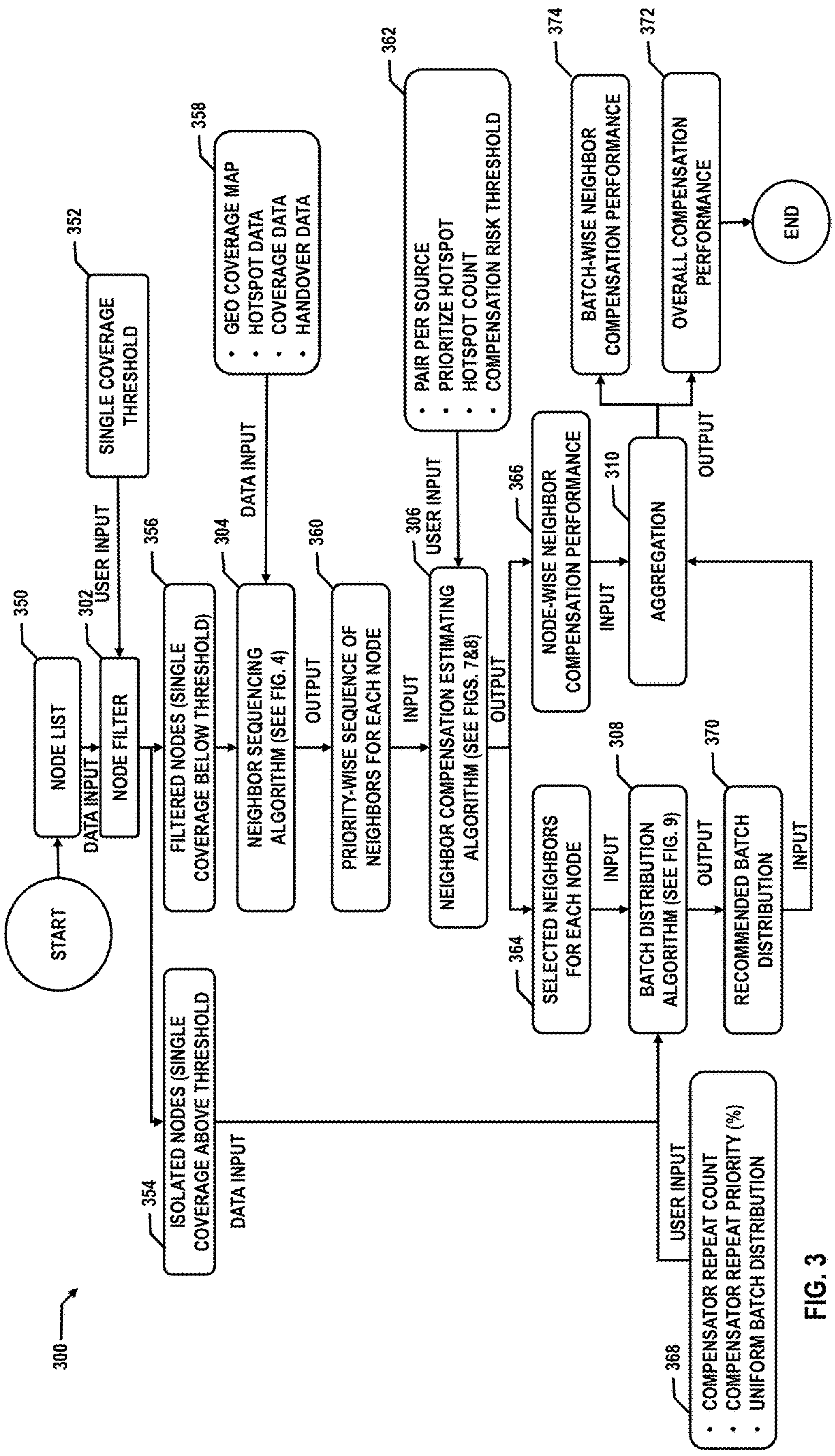
FIG. 3 is a flowchart of a method for node batch recommendation (NBR) according to some embodiments.

FIG. 3 is a flowchart 300 of a method for node batch recommendation (NBR) according to some embodiments.

In some embodiments, NBR method 300 describes process tasks for node batch recommendation for firmware or software updates as part of a smart scheduler architecture. While the operations of NBR method 300 are discussed and shown as having a particular order, each operation in NBR method 300 is configured to be performed in any order unless specifically called out otherwise. NBR method 300 is implemented as a set of operations, such as operations 302 through 310.

In some embodiments, NBR method 300 describes a batch recommendation algorithm.

At operation 302 of NBR method 300, a node filter receives a master node list 350 as a data input and a single coverage threshold 352 as a user input and filters the master node list based on the user-input single coverage threshold. In some embodiments, master node list 350 contains the nodes that are to have a firmware/software update. In some embodiments, the master node list is a list of nodes in a specified area.

In some embodiments, the single coverage threshold is a user-determined threshold set in a user interface (not discussed herein). In a non-limiting example, in response to a user setting the single coverage threshold at 80% (meaning any node having 80% or greater of the node's coverage area covered by a single neighboring node), the batch recommendation algorithm filters nodes having a single coverage threshold at 80% or greater and places the nodes in an isolated nodes grouping 354.

Continuing with the non-limiting example, the batch recommendation algorithm filters nodes from the master node list having a single coverage threshold lower than 80% and places the nodes in a filtered nodes grouping 356, which are later processed for neighbor sequencing (operation 304) and compensating (operation 306). The isolated nodes grouping 354 are not considered for neighbor sequencing and compensating as these nodes are isolated at or beyond the single coverage threshold 352, which the user believes makes the nodes unusable as a compensating neighbor node. The filtered nodes grouping 356 are eventually batched together by a batch distribution algorithm (operation 308) as selected neighbor nodes for each node being updated with firmware or software. These neighbor nodes are used in a criteria determination discussed below in operation 916. Both the isolated nodes grouping 354 and filtered nodes grouping 356 are also used in operation 902 as each node in the master node list is scheduled to have the firmware updated. Process flows from operation 302 to operation 304.

At operation 304 of NBR method 300, a neighbor sequencing algorithm prioritizes neighbor nodes based on the neighboring nodes capacity (e.g., in terms of coverage, handover success rate, and handover attempts). The operation of the neighbor sequencing algorithm is captured below in the two methods for sequencing neighbor nodes 400 in FIG. 4A.

Figure 4A:
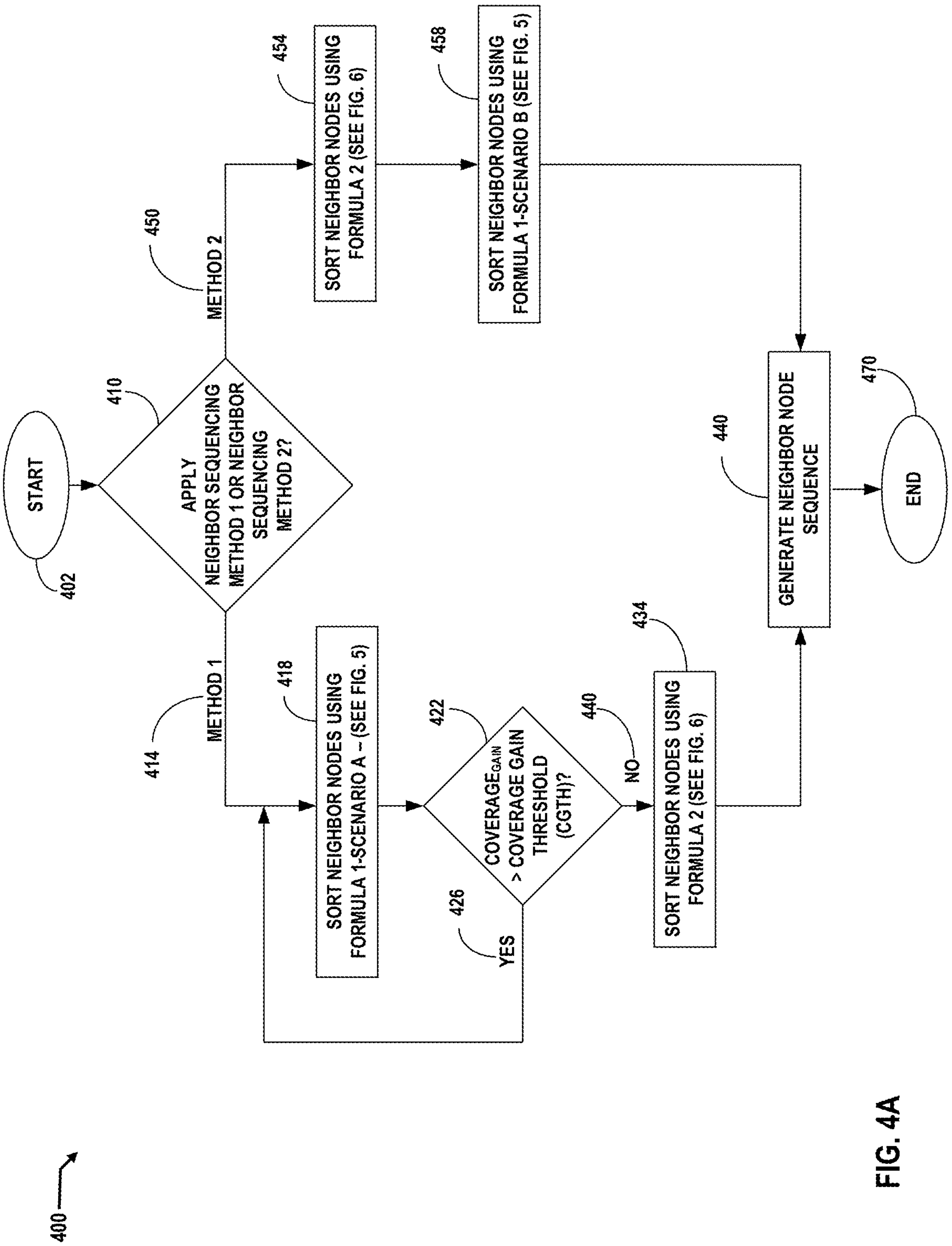
FIG. 4A is a flowchart of the two methods for sequencing neighbor nodes according to some embodiments.

FIG. 4A is a flowchart of the two methods for sequencing neighbor nodes 400 according to some embodiments.

In FIG. 4A, the process starts at operation 402 and a decision at operation 410 is made whether to apply method 1 or method 2 for sequencing neighbor nodes. In method 1 at operation 414, neighbors are first sequenced using formula 1-scenario A at operation 418 (see FIG. 5), where a neighbor sequence (from formula 2, see FIG. 6) is not given. Neighbor nodes are sequenced using formula 1-scenario A as described below with reference to FIG. 5. A decision is made whether the $\text{coverage}_{gain}$ is greater than the coverage gain threshold (CGth) at operation 422.

In response to the $\text{coverage}_{gain}$ being greater than the coverage gain threshold (CGth) at operation 426, the process loops back to operation 418 to consider other neighbor nodes for sequencing iteratively using formula 1-scenario A. The process loops through the neighbor nodes iteratively to determine the neighbor nodes that have the highest collective gain. The first neighbor nodes are the most important and the first neighbor nodes are thus used to determine which neighbor nodes maximize the coverage gain. However, in response to the gain starting to decrease, then looping through the remaining neighbor nodes does not provide a benefit. Instead, ML is applied to sort the remaining neighbor nodes. Thus, in response to the $\text{coverage}_{gain}$ not being greater than the coverage gain threshold (CGth) at operation 422, neighbor nodes are sorted using formula 2 (ML) at operation 434. Formula 2 is described in more detail with respect to FIG. 6. A neighbor node sequence is then generated at operation 440.

Figure 5:
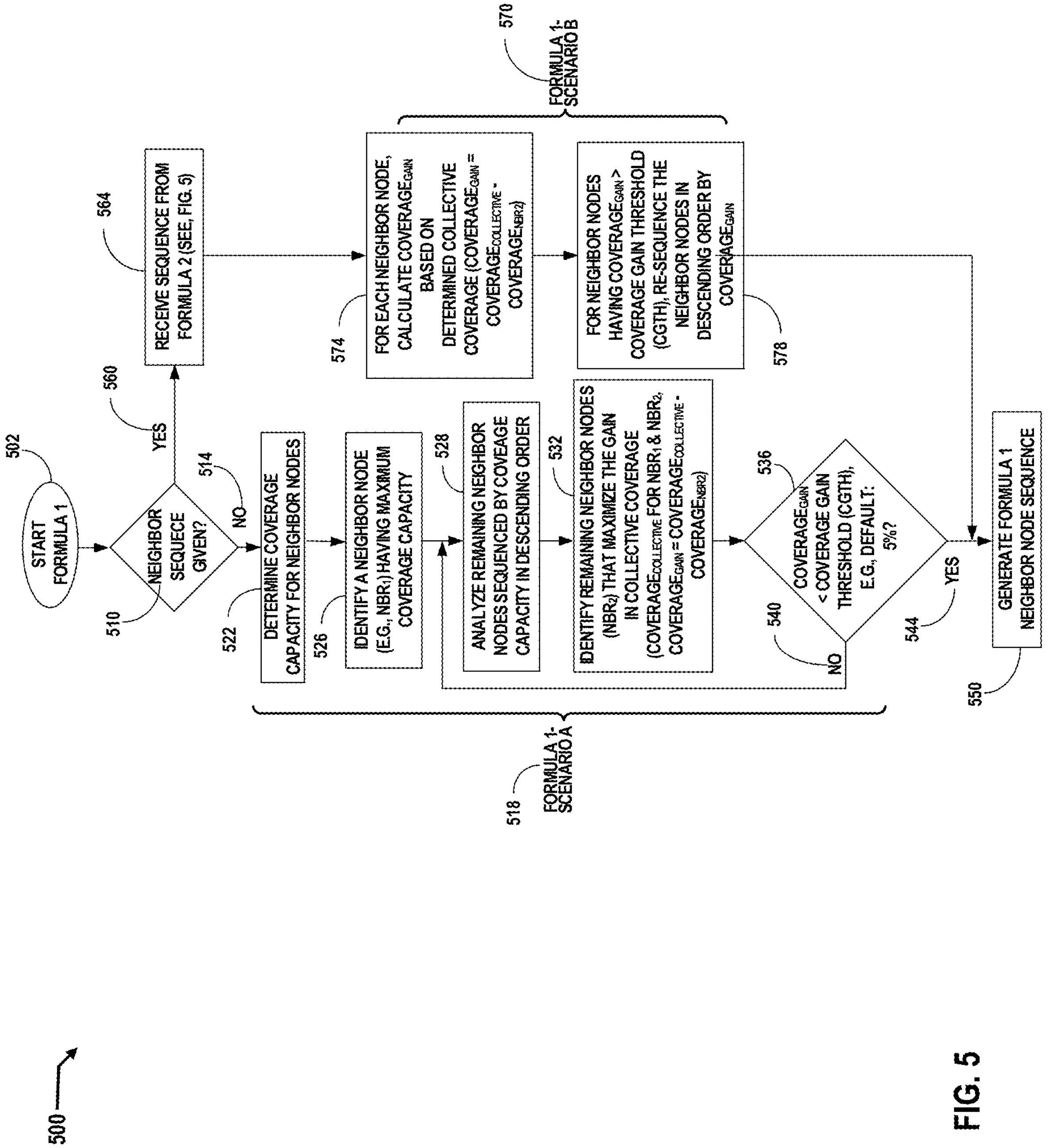
FIG. 5 is a flowchart of formula 1 for sequencing neighbor nodes according to some embodiments.
Figure 6:
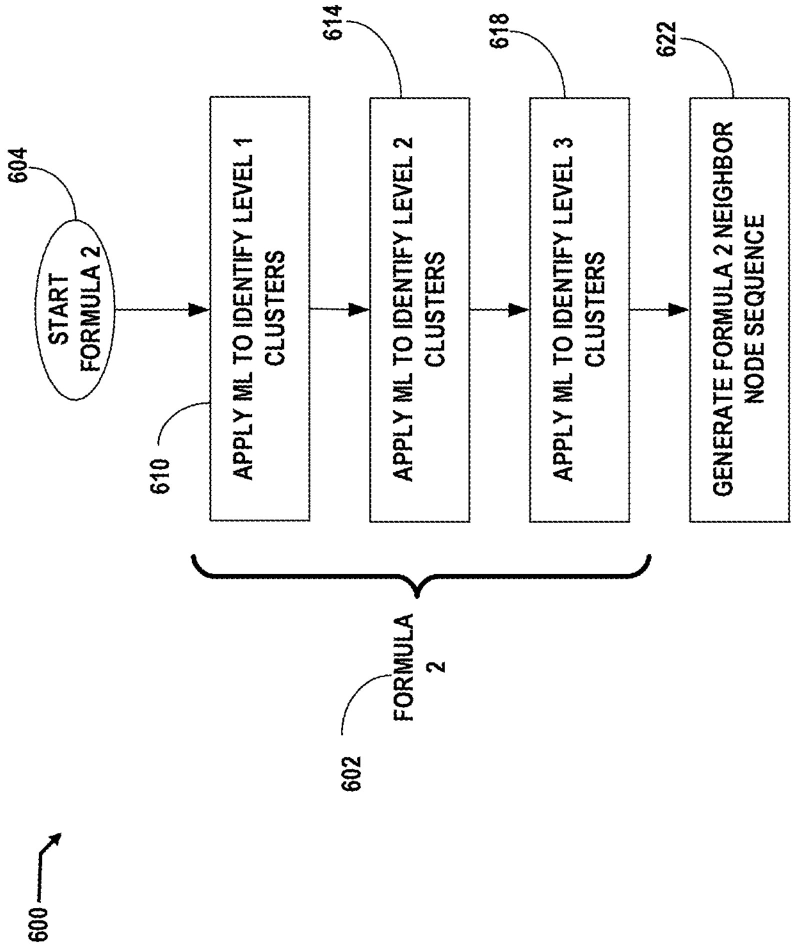
FIG. 6 is a flowchart of formula 2 for sequencing neighbor nodes using machine learning according to some embodiments.

In response method 2 being used at operation 450, neighbor nodes are first sorted using ML of formula 2 at operation 454 (see FIG. 6). Then, formula 1-scenario B at operation 458 (see FIG. 5) is applied, i.e., a neighbor node-sequence is given from the ML of formula 2 (see FIG. 6). Formula 1-scenario B is applied to calculate the collective coverage for a neighbor node and then re-sequence the neighbor nodes based on the gain in collective coverage. After applying formula 1-scenario B at operation 458, a neighbor node sequence is generated at operation 440. The process then ends at operation 470.

Method 1 at operation 414 applies formula 1-scenario A at operation 418 at first for selecting the top neighbor nodes, whereas method 2 at operation 450 applies formula 1-scenario B at operation 458 last for selecting the top neighbor nodes.

Method 1 at operation 414 is more time consuming because of the process of looping iteratively through the neighbor nodes using formula 1-scenario A at operation 418.

In addition to method 1 at operation 414 being more time consuming, method 1 at operation 414 is more expensive computationally. Method 2 at operation 450 is much faster than method 1 at operation 414 because there is no looping process involved and is less expensive computationally. However, statistically there is about a 5% deviation overall between method 1 at operation 414 and method 2 at operation 450. In method 1 at operation 414 and method 2 at operation 450, the two formulas, formula 1-scenario A/scenario B at operation 418/operation 458 and formula 2 at operation 434, 454 are able to be combined to create a neighbor sequencing operation.

Figure 4B:
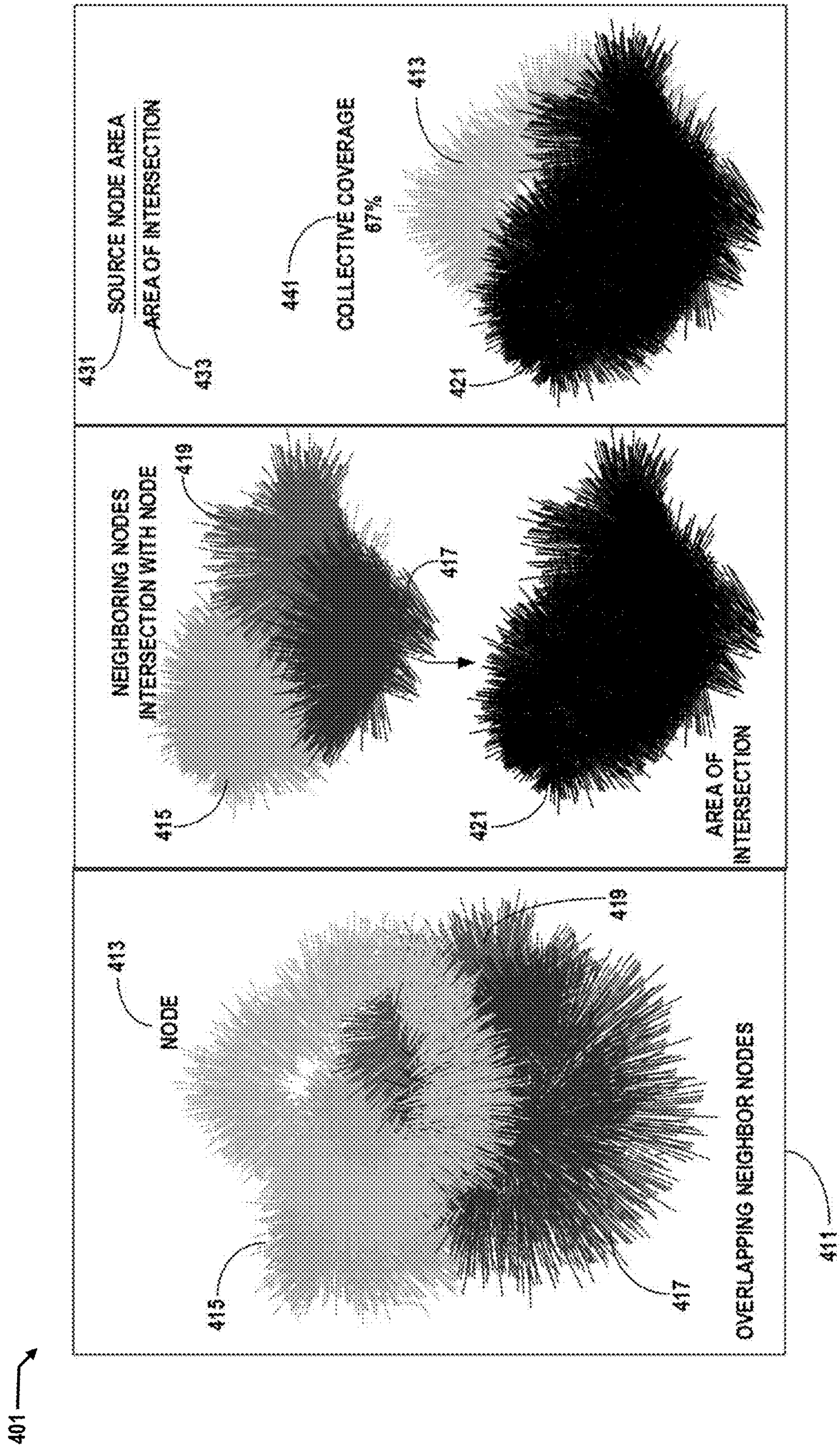
FIG. 4B is shows a method for determining a collective coverage of a node by neighbor nodes according to some embodiments.

FIG. 4B shows method 401 for determining a collective coverage of a node by neighbor nodes according to some embodiments.

In FIG. 4B, a map 411 of coverage of a node 413 and three neighbor nodes 415, 417, 419 are shown. Node 413 is a node on which the operation of software update and maintenance are executed. Node 413 is a node that is being planned to be shut down for maintenance or software update. Neighbor nodes 415, 417, 419 are nodes that are close to node 413 and that are usable for compensating in terms of coverage or handover for node 413 when the node 413 is offline due to maintenance or software update. Those skilled in the art recognize that a greater number or a lesser number of neighbor nodes 415, 417, 419 than three are able to be involved.

Compensation capacity-based sequence of neighbor nodes 415, 417, 419 is able to be pre-calculated for use as knowledgebase for the batch splitting operation. Once a new node 413 is added to the network, its corresponding neighbor node assessment is added to the knowledge base. This is treated as an isolated task that does not affect the batch-splitting pipeline, which will use the latest knowledgebase. First, neighbor nodes 415, 417, 419 are prioritized in terms of compensation capacity, which means coverage, handover, handover success and total handover attempts. Handover attempts are the number of times a call has been forwarded from a node 413 to one of neighbor nodes 415, 417, 419 and the handover success rate is a measure of how many times one of neighbor nodes 415, 417, 419 have successfully received those forwarded calls.

From the neighbor nodes 415, 417, 419, an area of intersection 421 of the neighbor nodes 415, 417, 419 is determined. Then, the area of intersection 421 is compared to the coverage of the node 413 to determine a collective coverage 441. collective coverage is the ratio of node area 431 to the area of intersection 433, $$\frac{\text{Source Node Area}}{\text{Area of intersection}}.$$

In FIG. 4B, collective coverage 441 is estimated to be 67%.

FIG. 5 is a flowchart 500 of formula 1 for sequencing neighbor nodes according to some embodiments.

In FIG. 5, formula 1 includes formula 1-scenario at operations 518 where a neighbor sequence (from formula 2 as described below) is not given and formula 1-scenario B at operations 570 where a neighbor sequence (from formula 2 as described below) is given. The process begins at operation 502 and a decision is made whether a neighbor sequence is given at operation 510. Neighbor sequence is provided for formula 1-scenario B at operations 570 but not formula 1-scenario A at operations 518.

In response to a neighbor sequence not being given at operation 514, coverage capacity is determined for neighboring nodes as explained above with respect to FIG. 4B at operation 522. Formula 1-scenario A at operations 518 identifies a neighbor node having a maximum coverage capacity at operation 526. As described above with reference to FIG. 4B, coverage capacity is estimated using geo mapping (from geo coverage map in data input 358 (FIG. 3)). The remaining neighbor nodes are analyzed according to coverage capacity in descending order at operation 528. Remaining neighbor nodes are identified that maximize the gain in collective coverage at operation 532, e.g., $\text{collective}_{coverage}$ for $NBR_1$, $NBR_2$, and the like. A neighbor node having the most gain in the collective coverage is added, and the process loops through the remaining neighbor nodes iteratively until the neighbor nodes have been considered. coverage gain is given by:

$$\text{Coverage}_{gain} = \text{Coverage}_{collective} - \text{Coverage}_{NBR_2}.$$

A decision is made whether the $\text{coverage}_{gain}$ is less than the coverage gain threshold (CGth) at operation 536. In response to the $\text{coverage}_{gain}$ not being less than the CGth at operation 540, the process loops back to operation 528 to consider other neighbor nodes iteratively. In response to the $\text{coverage}_{gain}$ being less than the CGth at operation 544, the sequencing in formula 1-scenario A stops and a formula 1 neighbor node sequence is generated at operation 550. As is shown below, the formula 1-scenario A is provided to a second formula, i.e., formula 2.

In response to a neighbor sequence being given (from formula 2) at operation 560, the neighbor sequence is received from formula 2 at operation 564. For formula 1-scenario B at operations 570, the $\text{coverage}_{gain}$ is calculated for a neighbor node in the given sequence at operation 574. For neighbor nodes having a $\text{coverage}_{gain}$ that is greater than the coverage gain threshold (CGth), these neighbor nodes are re-sequenced in descending order by $\text{coverage}_{gain}$ at operation 578. Formula 1-scenario B at operations 570 then stops and a neighbor node sequence is generated at operation 550.

FIG. 6 is a flowchart 600 of formula 2 for sequencing neighbor nodes using ML according to some embodiments.

In FIG. 6, formula 2 at operation 602 is based on ML. In FIG. 6, the process for formula 2 starts at operation 604 and ML is applied to cluster neighbor nodes. For example, in some embodiments, ML uses an agglomerative hierarchical clustering algorithm. Neighbor node sequencing is performed considering three performance parameters with hierarchically descending priority sequence as: (1) coverage, (2) handover success rate, and (3) handover attempt count. Neighbor nodes are clustered based on the first priority parameter, e.g., coverage is the highest priority, second is handover success rate, and next is handover attempts. Thus, a hierarchy of priorities for the parameters is used. The neighbors which are having very close coverage performance are clustered. In these clusters, the nodes are re-clustered again based on handover success rate. Inside the second level clusters, the neighbors are sequenced by handover attempts.

As shown in FIG. 6, ML is applied to identify level 1 clusters at operation 610. Level 1 clusters are neighbor nodes that are clustered based on a similarity in coverage compensation. In some embodiments, the ML is agglomerative hierarchical clustering that groups neighbor nodes together that have a significantly low variance range. Accordingly, neighbor nodes that are clustered under the same cluster are inseparable due to similarity in coverage compensation scale.

ML is applied to identify level 2 clusters at operation 614. Inside level 1 cluster are level 2 clusters that are micro-clusters. Level 2 clusters are clustered based on handover success rate. The level 1 clusters and the level 2 microclusters inside the level 1 clusters are sequenced using a corresponding average in parameter values, e.g., coverage and handover success-rate for level 1 clusters and level 2 micro-clusters, respectively.

ML is applied to identify level 3 clusters at operation 618. Level 3 clusters are the neighbor nodes inside the level 2 microclusters that are sequenced based on the total handover attempts with the node.

Thus, after three steps, neighbor nodes are sequenced, and a formula 3 neighbor node sequence is generated at operation 622.

In FIG. 3, at completion of the neighbor sequencing algorithm at operation 304, the process flows to operation 306. At operation 306 of NBR method 300, a priority-wise sequence of neighbor nodes 360 for each node from the filtered nodes grouping 356 is processed by a neighbor compensation estimating algorithm.

Figure 7:
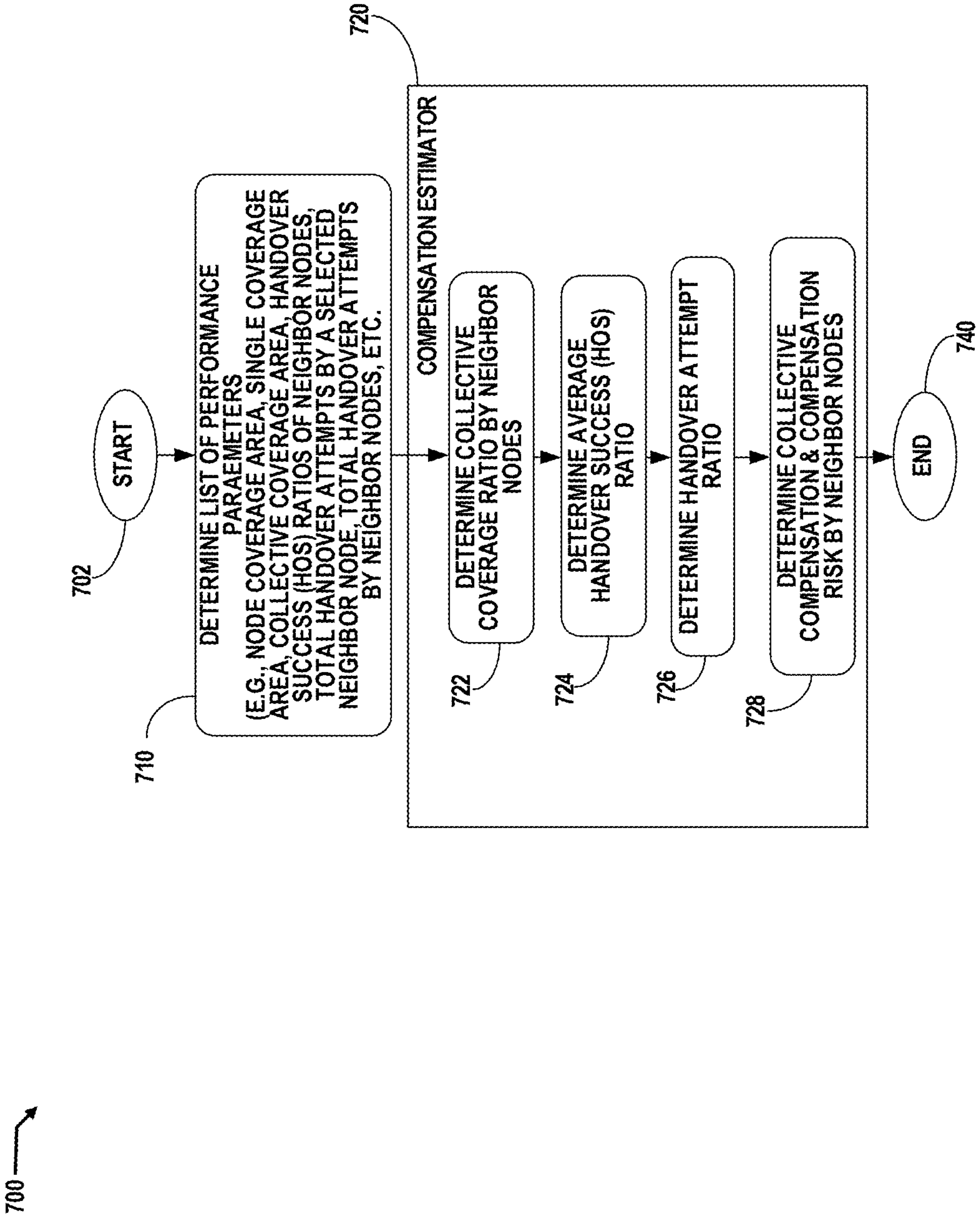
FIG. 7 is a flowchart of operation of a neighbor node compensation estimator according to some embodiments.

FIG. 7 is a flowchart of operation of a neighbor node compensation estimator 700 according to some embodiments.

In FIG. 7, the process starts at operation 702 and a list of performance parameters at operation 710 associated with determining compensation by neighbor nodes for a node to be shut down for upgrade or maintenance operations is determined at operation 710. The list of performance parameters includes a node coverage area based on a total coverage area of the node, a single coverage area, which is the portion of the node coverage area that is not overlapped by any other neighbor node, a collective coverage area, which is the portion of the node coverage area that is by other neighbor nodes, HOS ratio of neighbor nodes, a number of the total handover attempts by a selected neighbor node, and a number of the total handover attempts by neighbor nodes.

A neighbor node compensation estimator receives the list of performance parameters at operation 720.

Neighbor node compensation estimator uses the node coverage area, which is based on a total coverage area of the node, a single coverage area, which is the portion of the node coverage area that is not overlapped by any other neighbor node, and a collective coverage area, which is the portion of the node coverage area that is by other neighbor nodes to determine a collective coverage ratio by neighbor nodes at operation 722.

The collective coverage ratio is the percentage (%) of the total coverable area of the node that is collectively covered by the selected neighbor nodes. The collective coverage ratio is equal to:

$$\frac{(\text{Source Node Coverage Area} - \text{Single Coveage Area})}{\text{Collective Coverage Area}}$$

wherein the node coverage area is the total coverage area of the node, the single coverage area is the portion of the node coverage area that has not been overlapped by any other neighbor node, and the collective coverage area is the portion of the node coverage area that been overlapped by other neighbor nodes.

Neighbor node compensation estimator uses the HOS ratio of neighbor nodes to determine an average HOS ratio at operation 724. The average HOS ratio is the average of the HOS ratio of neighbor nodes.

Neighbor node compensation estimator uses a number of the total handover attempts by a selected neighbor node, and a number of the total handover attempts by neighbor nodes to determine a handover attempt ratio at operation 726. The handover attempt ratio is equal to:

$$\frac{\text{Total Handover Attempts by the selected Neighbor Node}}{\text{Total Handover Attempts by all Neighbor Nodes}}.$$

Neighbor node compensation estimator then determines a collective neighbor node compensation based on a weighted average of the collective coverage ratio, the average HOS ratio, and the handover attempt ratio, and determines a compensation Risk based on the collective neighbor node compensation at operation 728. In one embodiment, the weighted average for determining the collective neighbor node compensation is based on weighting the collective coverage ratio at 70%, the average HOS ratio at 20%, and the handover attempt ratio at 10%. However, those skilled in the art recognize that different weightings are able to be used. The compensation Risk is:

$$1 - \text{Collective Neighbor Node Compensation}$$

Figure 8:
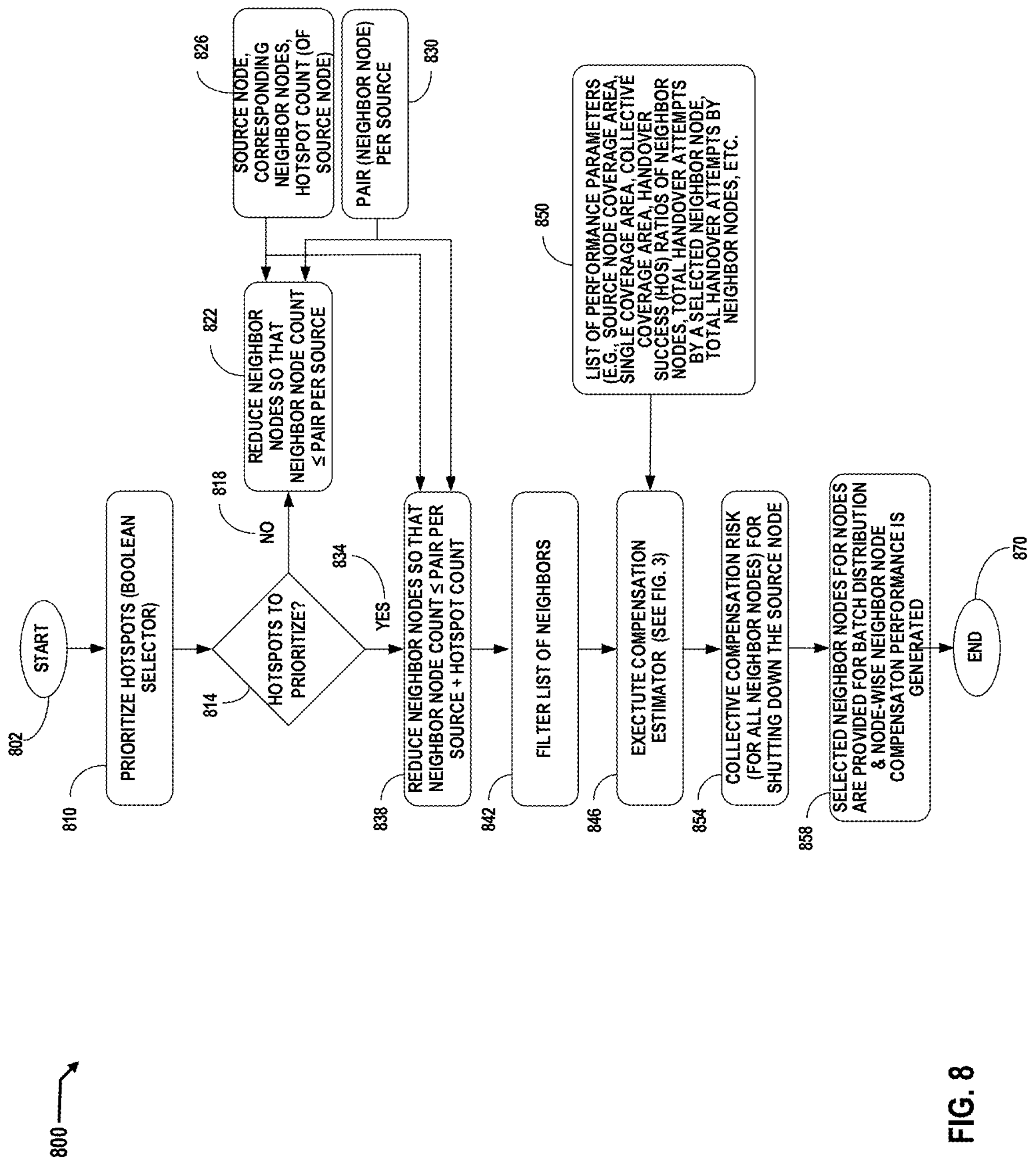
FIG. 8 is a flowchart of a method for determining neighbor compensation estimation for smart scheduler for managing software updates to radio nodes in a wireless mobile network according to some embodiments.

FIG. 8 is a flowchart 800 of a method for determining neighbor compensation estimation for smart scheduler for managing software updates to radio nodes in a wireless mobile network according to some embodiments.

In FIG. 8, the process starts at operation 802 and a user provides input at user input 362 (FIG. 3) to select whether hotspots are to be prioritized at operation 810. For example, a Boolean selector is able to be presented to a user on a UI that enables a user select to prioritize hotspots or to not prioritize hotspots.

The neighbor compensation estimator determines from the input whether to prioritize hotspots at operation 814.

Nodes, a priority-wise sequence of neighbor nodes corresponding to the nodes, and a hotspot count (a user input 362 (FIG. 3)) of a node are provided at operation 818. Pair per source is a user input 362 (FIG. 3), which is a maximum number of compensating neighbor nodes that a node is usable is provided at operation 822.

In response to there not being hotspots to prioritize at operation 826, the neighbor nodes are reduced so that the neighbor count is ≤pair per source at operation 830, based on the input provided at operation 818 and at operation 822.

In response to there being hotspots to prioritize at operation 834, the neighbor nodes are reduced so that the neighbor count is ≤pair per source+hotspot count, based on the input provided at operation 818 and at operation 822. For example, in one scenario, more than three neighbor nodes are not to be used for a node. In response to the node including 2 hotspots, two additional neighbor nodes for a total of a maximum of 5 neighbor nodes are able to be included. Thus, the neighbor node count is reduced to 5 total neighbor nodes at operation 838.

The list of neighbor nodes is then filtered at operation 842.

The neighbor node compensation estimator, as described with regard to FIG. 7, is executed to determine the collective neighbor node compensation for neighbor nodes of nodes being shut down at operation 846. As shown in FIG. 8, the list of performance parameters as described in FIG. 7, is provided at operation 850. The list of performance parameters includes a node coverage area based on a total coverage area of the node, a single coverage area, which is the portion of the node coverage area that is not overlapped by any other neighbor node, a collective coverage area, which is the portion of the node coverage area that is by other neighbor nodes, HOS ratio of neighbor nodes, a number of the total handover attempts by a selected neighbor node, and a number of the total handover attempts by neighbor nodes.

The neighbor node compensation estimator at operation 850 determines the collective coverage ratio that is equal to:

$$\frac{(\text{Source Node Coverage Area} - \text{Single Coveage Area})}{\text{Collective Coverage Area}}$$

wherein the node coverage area is the total coverage area of the node, the single coverage area is the portion of the node coverage area that has not been overlapped by any other neighbor node, and the collective coverage area is the portion of the node coverage area that been overlapped by other neighbor nodes.

The neighbor node compensation estimator at operation 850 uses the HOS ratio of neighbor nodes to determine an average HOS ratio. The average HOS ratio is the average of the HOS ratio of neighbor nodes.

Neighbor node compensation estimator uses a number of the total handover attempts by a selected neighbor node, and a number of the total handover attempts by neighbor nodes to determine a handover attempt ratio. The handover attempt ratio is equal to:

$$\frac{\text{Total Handover Attempts by the selected Neighbor Node}}{\text{Total Handover Attempts by all Neighbor Nodes}}$$

Neighbor node compensation estimator then determines at operation 850 a collective neighbor node compensation based on a weighted average of the collective coverage ratio, the average HOS ratio, and the handover attempt ratio, and determines a compensation risk based on the collective neighbor node compensation. In one embodiment, the weighted average for determining the collective neighbor node compensation is based on weighting the collective coverage ratio at 70%, the average HOS ratio at 20%, and the handover attempt ratio at 10%. However, those skilled in the art recognize that different weightings are able to be used. The purpose of the neighbor compensation calculation is to represent neighbor performance indicators through one single parameter. The weights are able to be adjusted in the UI.

Based on the collective neighbor node compensation determined by the neighbor node compensation estimator, the compensation risk for neighbor nodes of a node being shut down is determined at operation 854. The compensation risk is;

$$1 - \text{Collective Neighbor Node Compensation.}$$

Selected neighbor nodes for a node are provided for batch distribution determination and node-wise neighbor node compensation is generated at operation 858. Accordingly, the smart scheduler is able to provide uniform batch distribution based on the collective neighbor node compensation and compensation risk determinations.

The process then terminates at operation 870.

At least one embodiment of the method includes receiving a list of performance parameters. The list of parameters is processed to determine a collective coverage ratio by neighbor nodes, an average HOS ratio, and a handover attempt ratio. Based on the collective coverage ratio, the HOS ratio, and the handover attempt ratio, a collective neighbor node compensation is determined by the neighbor nodes.

In FIG. 3, at the completion of the neighbor compensation estimating algorithm at operation 306 outputs selected neighbors for each node 364 to be used by a batch distribution algorithm at operation 308. Further, the neighbor compensation estimating algorithm at operation 306 outputs a node-wise neighbor compensation performance 366. Operation 308 is discussed in detail below regarding node batch distribution (NBD) method 900.

Figure 9:
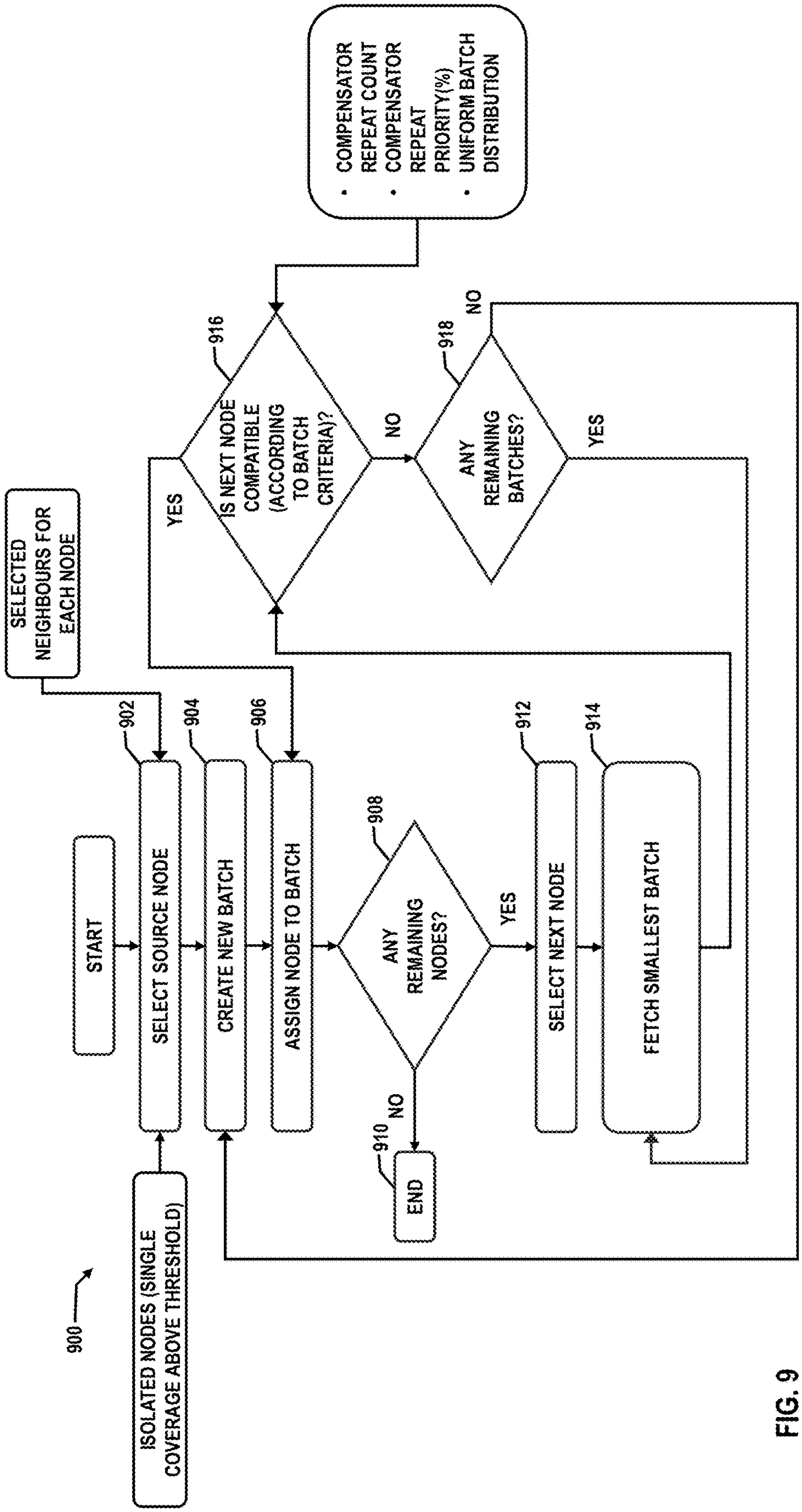
FIG. 9 is a flowchart of a method for node batch distribution (NBD) according to some embodiments.

FIG. 9 is a flowchart 900 of a method for node batch distribution (NBD) according to some embodiments.

In some embodiments, NBD method 900 describes process tasks for node batch distribution in a node clustering operation as part of a smart scheduler architecture. While the operations of NBD method 900 are discussed and shown as having a particular order, each operation in NBD method 900 is configured to be performed in any order unless specifically called out otherwise. NBD method 900 is implemented as a set of operations, such as operations 902 through 918.

In some embodiments, NBD method 900 is a batch distribution operation for the smart scheduler. In some embodiments, NBD method 900 is configured with a set of criteria that determine a group of source nodes which satisfy certain criteria to be considered as a batch. In some embodiments, a batch is a group of nodes that do not directly interfere with each. That means the nodes in a batch are not direct neighbors, and therefore capable of being shut down together. Neighbor nodes are compensator nodes to the source node in response to the source node being shut down. Therefore, a source node and the compensating neighbor node are not shut down together.

In some embodiments, a source node satisfies several criteria before being added to a preexisting batch containing one or more source nodes. One criterion stipulates that a source node is unable to be in multiple batches. Another criterion is a source node is unable to be configured as both a source node and a neighbor node in the same batch. Yet another criterion is a neighbor node is unable to exceed a user-defined compensator repeat count (e.g., a user-defined number of sources provided by user input 368 (FIG. 3)). This criterion is a precaution to prevent neighbor nodes from being overwhelmed by compensating for too many source nodes. In response to these criteria being satisfied, a source node is added to a pre-existing batch.

In some embodiments, the batch distribution algorithm ensures uniform or near-uniform distribution of the source nodes across batches. In some embodiments, the batch criteria ensure a near uniform or uniform distribution is being fulfilled. As discussed below, the batch distribution algorithm attempts to pair source nodes with the smallest existing batch to ensure as uniform a distribution as possible.

At operation 902 of NBD method 900, the batch distribution algorithm selects a node (to be a source node) from a list of nodes provided by the smart scheduler. In some embodiments, a list of nodes is provided by a batch recommendation algorithm (not discussed herein), that filters a nodes master list into isolated nodes, which have single coverage (e.g., percentage of the coverage area for a node that is not shared/covered by any other neighbor node) above a threshold (e.g., minimum single coverage for a radio node to consider isolated), and filtered nodes, which have single coverage below threshold.

In some embodiments, the single coverage threshold is a user-determined threshold set in a user interface (not discussed herein). In a non-limiting example, in response to a user setting the single coverage threshold at 80%, the batch recommendation algorithm separates nodes having a single coverage threshold at 80% or worse and places the nodes in an isolated nodes grouping.

Continuing with the non-limiting example, the batch recommendation algorithm filters nodes from the master node list having a single coverage threshold lower than 80% and places the nodes in a filtered nodes grouping, which is later processed for neighbor sequencing and compensating. The isolated nodes are not considered for neighbor sequencing and compensating as these nodes are isolated at or beyond a user-defined threshold, which the user believes makes the nodes unusable as a compensating neighbor node. The filtered nodes are eventually sent to the batch distribution algorithm as selected neighbor nodes for each node. These neighbor nodes are used in the criteria determination discussed below in operation 916. Both the isolated nodes and filtered nodes are also used in operation 902 as each node in the master node list is scheduled to have the firmware updated. Process flows from operation 902 to operation 904.

At operation 904 of NBD method 900, a new batch is created. Process flows from operation 904 to operation 906.

At operation 906 of NBD method 900, the node selected in operation 902 is assigned to the batch created in operation 904. Process flows from operation 906 to operation 908.

At operation 908 of NBD method 900, a determination is made by the batch distribution algorithm whether there are any remaining nodes which are unassigned to a batch. In response to no remaining nodes ("NO" branch of block 908), process flows to operation 910 where the batch distribution algorithm terminates, and the created batches are forwarded to a batch scheduling module (not discussed) to schedule timeslots to perform software/firmware updates. In response to nodes remaining ("YES" branch of block 908), process flows to operation 912.

At operation 912 of NBD method 900, another node is selected by the batch distribution algorithm. Process flows from operation 912 to operation 914.

At operation 914 of NBD method 900, the smallest existing batch at the time of execution of operation 914 is retrieved for a comparison with the selected node of operation 912. Process flows from operation 914 to operation 916.

At operation 916 of NBD method 900, a determination is made by the batch distribution algorithm whether the node selected at operation 912 is compatible with the smallest existing batch based upon the batch criteria. Therefore, the batch distribution algorithm determines, does the node already exist in the batch, is the node unusable as the node serves as a neighbor node for a source node in the batch, and, based on the compensator repetition count, is the node safe from causing a violation of the compensator repetition count (e.g., neighbor nodes are able to compensate without violating the user-defined compensator repeat count). This is a precautionary measure to prevent a neighbor from being overwhelmed by interacting with too many sources.

In response to each criterion being satisfied ("YES" branch of block 916), process flows from operation 916 to operation 906 and the node of operation 912 is assigned to the smallest batch and the process continues iteratively again onto operation 908 as discussed above.

In response to at least one criterion not being satisfied ("NO" branch of block 916), process flows from operation 916 to operation 918.

At operation 918 of NBD method 900, the batch distribution algorithm determines whether there are any remaining existing batches in which to pair the node of operation 912. In response to there being no remaining batches to pair with ("NO" branch of block 918), process flows to operation 904, a new batch is created, and process flows to operation 906 as discussed above. In response to there being remaining batches to pair with ("YES" branch of block 918), process flows to operation 914, the smallest batch of the remaining batches is fetched, and process flows to operation 916 as discussed above.

In some embodiments, the iterative process of the batch distribution algorithm continues until the process reaches operation 910, all nodes are assigned to a batch, the batch distribution algorithm is complete, and the batches are outputted to a batch scheduling module.

In some embodiments, the user modifies the number of batches created. In some embodiments, the user increases or decreases the batch number. In some embodiments, the initial batch number is pre-determined by the batch distribution algorithm (e.g., based on number of nodes). In response to the user increasing the batch size, the primary batches (system-recommended batches after the batch-distribution operation) are sliced into halves (secondary batches) until the user-defined increased batch number equals the total number of primary and secondary batches.

In response to the user increasing the batch size, the batch distribution algorithm is repeated with the new user-defined decrease batch number. In some embodiments, smaller batches ensure more reliable scheduling. In some embodiments, based on a simulation of the batch distribution, the user increases the number of batches, which might be helpful for a smoother or reduced scheduling risk. In some embodiments, in response to the user wanting to reduce the number of batches, there is a possibility that the third criterion is violated. For example, a reduced number of batches increases a neighbor repeat ratio (e.g., smaller batches increase the number of source nodes in a batch, which increases the possibility of a neighbor node compensating for multiple source nodes and possibly violating the compensator repeat count). This has the potential to increase the risk of a neighbor node being overwhelmed due to interacting with too many source nodes. In an extreme non-limiting example, in response to a user decreasing the batch count to 1, then all the nodes are sources with no neighboring nodes to compensate. Thus, the compensation rate is 0% and the compensation risk score during a firmware update is 100% (meaning an assurance of no coverage during the update). Therefore, a user considers these risks in reducing the number of batches.

In FIG. 3, at the completion of operation 308, the process flows from operation 308 to operation 310.

At operation 310 of NBR method 300, recommended batch distribution 370 and node-wise compensation performance 366 are aggregated. Node-wise compensation performance 366 is a node-wise compensation score for filtered best compensating neighbors for every node at operation 306. And those inputs are fed to an algorithm that averages or aggregates the node-wise compensation performance 366 based on the recommended batch distribution 370. The output of operation 310 is an overall compensation performance 372 for the batches and a batch-wise neighbor compensation performance 374 for each batch.

Figure 10:
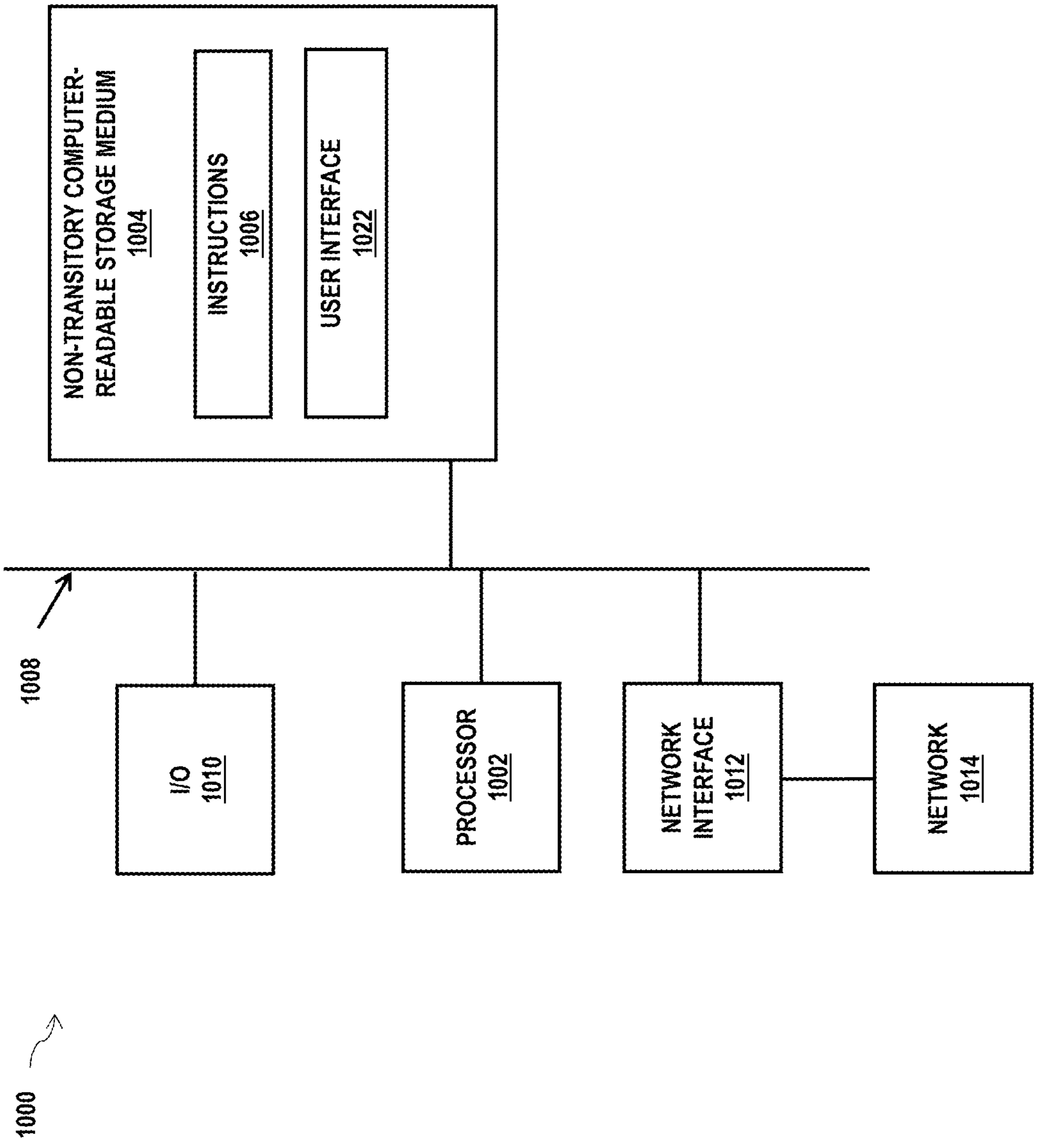
FIG. 10 is a high-level functional block diagram of a processor-based system according to some embodiments.

FIG. 10 is a high-level functional block diagram of a processor-based system 1000 according to some embodiments.

In some embodiments, processor-based system 1000 is a general-purpose computing device including a hardware processor 1002 and a non-transitory, computer-readable storage medium 1004. Storage medium 1004, amongst other things, is encoded with, i.e., stores, computer program code 1006, i.e., a set of executable instructions such as an algorithm, or methods 300, 400, 401, 500, 600, 700, 800, and 900. Execution of instructions 1006 by hardware processor 1002 represents (at least in part) a batch recommendation algorithm which implements a portion, or all the methods described herein in accordance with one or more embodiments (hereinafter, the noted processes and/or methods).

Processor 1002 is electrically coupled to the computer-readable storage medium 1004 via bus 1008. Processor 1002 is further electrically coupled to an I/O interface 1010 by bus 1008. A network interface 1012 is further electrically connected to processor 1002 via bus 1008. Network interface 1012 is connected to a network 1014, so that processor 1002 and computer-readable storage medium 1004 connect to external elements via network 1014. Processor 1002 is configured to execute computer program code 1006 encoded in computer-readable storage medium 1004 to cause processor-based system 1000 to be usable for performing a portion or all the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause processor-based system 1000 to be usable for performing a portion or all the noted processes and/or methods. In one or more embodiments, storage medium 1004 further stores information, such as an algorithm which facilitates performing a portion or all the noted processes and/or methods.

Processor-based system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

Processor-based system 1000 further includes network interface 1012 coupled to processor 1002. Network interface 1012 allows processor-based system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, are implemented in two or more processors 1002.

Processor-based system 1000 is configured to receive information through I/O interface 1010. The information received through I/O interface 1010 includes one or more instructions, data, rules, and/or other parameters for processing by processor 1002. The information is transferred to processor 1002 via bus 1008. Processor-based system 1000 is configured to receive information related to user-interface (UI) 1022 through I/O interface 1010. The information is stored in computer-readable medium 1004 as user interface (UI) 1022.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

[1] An aspect of this description is directed to a method that includes filtering a master node list, wherein a node is a network node configured to create, receive, or transmit information, into an isolated nodes grouping and a filtered nodes grouping based on a single-coverage threshold; sequencing, for each node in the filtered nodes grouping, a priority-based sequence of compensating neighbor nodes, where compensating neighbor nodes are prioritized in terms of compensating capacity; determining a collective neighbor compensation performance based on an overall compensation provided by the compensating neighbor nodes for a given node that is to be shut down; and distributing each node from the master node list into one or more batches, based on a batch criteria.

[2] The method described in [1], further includes, aggregating the one or more batches with the collective neighbor compensation performance.

[3] The method described in [1] to [2], further includes, determining a neighbor-compensation performance of each batch; and causing the neighbor-compensation performance of each batch to display on a user interface.

[4] The method described in [1] to [3], further includes, determining an overall neighbor-compensation performance the one or more batches; and causing the overall neighbor-compensation performance of each batch to display on a user interface.

[5] The method described in [1] to [4], wherein the distributing each node from the master node list into the one or more batches, based on the batch criteria further includes accepting a user-input compensator repeat count that determines a maximum number of nodes a compensating neighbor node is able to support simultaneously; accepting a user-input compensator repeat priority that determines an impact ratio of compensator repetition in an overall neighbor-compensation performance; and accepting a user-toggle switch for a uniform batch distribution, which is used to ensure near uniform distribution of the compensating neighbor nodes and the isolated nodes across the batches.

[6] The method described in [1] to [5], wherein the determining the collective neighbor compensation performance further includes accepting a user-input pair-per source that sets a maximum number of compensating neighbor nodes; accepting a user-input prioritize hotspot toggle to prioritize nodes covering hotspots by assigning additional compensating neighbor nodes; accepting a hotspot count that provides a number of hotspots for each node; and accepting a user-input compensation-risk threshold where the additional compensating neighbor nodes are added to compensate until a collective compensation risk is below the compensation-risk threshold.

[7] The method described in [1] to [6], wherein the sequencing the priority-based sequence of compensating neighbor nodes further includes accepting a geographic coverage map; accepting a hotspot count that provides a number of hotspots for each node; accepting coverage data for each node from the master node list; and accepting handover data for each node from the master node list.

[8] An aspect of this description is directed to an apparatus configured to filter a master node list, wherein a node is a network node configured to create, receive, or transmit information, into an isolated nodes grouping and a filtered nodes grouping based on a single-coverage threshold; sequence, for each node in the filtered nodes grouping, a priority-based sequence of compensating neighbor nodes, where compensating neighbor nodes are prioritized in terms of compensating capacity; determine a collective neighbor compensation performance based on an overall compensation provided by the compensating neighbor nodes for a given node that is to be shut down; and distribute each node from the master node list into one or more batches, based on a batch criteria.

[9] The apparatus described in [8], further configured to aggregate the one or more batches with the collective neighbor compensation performance.

[10] The apparatus described in [8] to [9], further configured to determine a neighbor-compensation performance of each batch; and cause the neighbor-compensation performance of each batch to display on a user interface.

[11] The apparatus described in [8] to [10], further configured to determine an overall neighbor-compensation performance the one or more batches; and cause the overall neighbor-compensation performance of each batch to display on a user interface.

[12] The apparatus described in [8] to [11], further configured to distribute each node from the master node list into the one or more batches, based on the batch criteria by accepting a user-input compensator repeat count that determines a maximum number of nodes a compensating neighbor node is able to support simultaneously; accepting a user-input compensator repeat priority that determines an impact ratio of compensator repetition in an overall neighbor-compensation performance; and accepting a user-toggle switch for a uniform batch distribution, which is used to ensure near uniform distribution of the compensating neighbor nodes and the isolated nodes across the batches.

[13] The apparatus described in [8] to [12], further configured to determine the collective neighbor compensation performance by accepting a user-input pair-per source that sets a maximum number of compensating neighbor nodes; accepting a user-input prioritize hotspot toggle to prioritize nodes covering hotspots by assigning additional compensating neighbor nodes; accepting a hotspot count that provides a number of hotspots for each node; and accept a user-input compensation-risk threshold where the additional compensating neighbor nodes are added to compensate until a collective compensation risk is below the compensation-risk threshold.

[14] The apparatus described in [8] to [13], further configured to sequence the priority-based sequence of compensating neighbor nodes by accepting a geographic coverage map; accept a hotspot count that provides a number of hotspots for each node; accepting coverage data for each node from the master node list; and accepting handover data for each node from the master node list.

[15] An aspect of this description is directed to a non-transitory computer-readable media having computer-readable instructions stored thereon, which when executed perform operations to filter a master node list, wherein a node is a network node configured to create, receive, or transmit information, into an isolated nodes grouping and a filtered nodes grouping based on a single-coverage threshold; sequence, for each node in the filtered nodes grouping, a priority-based sequence of compensating neighbor nodes, where compensating neighbor nodes are prioritized in terms of compensating capacity; determine a collective neighbor compensation performance based on an overall compensation provided by the compensating neighbor nodes for a given node that is to be shut down; and distribute each node from the master node list into one or more batches, based on a batch criteria.

[16] The non-transitory computer-readable media described in [15], further configured to aggregate the one or more batches with the collective neighbor compensation performance.

[17] The non-transitory computer-readable media described in to [18], further configured to determine a neighbor-compensation performance of each batch; and cause the neighbor-compensation performance of each batch to display on a user interface.

[18] The non-transitory computer-readable media described in to [17], further configured to determine an overall neighbor-compensation performance the one or more batches; and cause the overall neighbor-compensation performance of each batch to display on a user interface.

[19] The non-transitory computer-readable media described in to [18], further configured to distribute each node from the master node list into the one or more batches, based on the batch criteria by accepting a user-input compensator repeat count that determines a maximum number of nodes a compensating neighbor node is able to support simultaneously; accepting a user-input compensator repeat priority that determines an impact ratio of compensator repetition in an overall neighbor-compensation performance; and accepting a user-toggle switch for a uniform batch distribution, which is used to ensure near uniform distribution of the compensating neighbor nodes and the isolated nodes across the batches.

[20] The non-transitory computer-readable media described in to [19], further configured to determine the collective neighbor compensation performance by accepting a user-input pair-per source that sets a maximum number of compensating neighbor nodes; accepting a user-input prioritize hotspot toggle to prioritize nodes covering hotspots by assigning additional compensating neighbor nodes; accepting a hotspot count that provides a number of hotspots for each node; and accepting a user-input compensation-risk threshold where the additional compensating neighbor nodes are added to compensate until a collective compensation risk is below the compensation-risk threshold.

Separate instances of these programs can be executed on or distributed across any number of separate computer systems. Thus, although certain operations have been described as being performed by certain devices, software programs, processes, or entities, this need not be the case. A variety of alternative implementations is understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method, comprising:

receiving a master node list at a node filter;

accepting user input single coverage threshold at the node filter;

filtering, the master node list using the user input single coverage threshold, wherein a node is a network node configured to create, receive, or transmit information, into an isolated nodes grouping and a filtered nodes grouping based on a single-coverage threshold;

applying artificial intelligence (AI) to sequence, for each node in the filtered nodes grouping, a priority-based sequence of compensating neighbor nodes, where the compensating neighbor nodes are prioritized by the AI in terms of compensating capacity;

determining, a collective neighbor compensation performance based on an overall compensation provided by the compensating neighbor nodes for a given node that is to be shut down;

distributing each node from the master node list into one or more batches based on a batch criteria;

scheduling the one or more batches for a firmware update of the nodes in each of the one or more batches, wherein nodes within a same batch are shut down together and compensating neighbor nodes provide coverage support during the firmware update; and implementing the firmware update for the nodes in each of the one or more batches.

2. The method of claim 1, further comprising:

aggregating, the one or more batches with the collective neighbor compensation performance.

3. The method of claim 2, further comprising:

determining, a neighbor-compensation performance of each of the one or more batches; and causing the neighbor-compensation performance of each of the one or more batches to display on a user interface.

4. The method of claim 2, further comprising:

determining, an overall neighbor-compensation performance the one or more batches; and causing the overall neighbor-compensation performance of each batch to display on a user interface.

5. The method of claim 1, wherein the distributing each node from the master node list into the one or more batches, based on the batch criteria comprises:

accepting, a user-input compensator repeat count that determines a maximum number of nodes a compensating neighbor node is able to support simultaneously;

accepting, a user-input compensator repeat priority that determines an impact ratio of compensator repetition in an overall neighbor-compensation performance; and accepting, a user-toggle switch for a uniform batch distribution, which is used to ensure near uniform distribution of the compensating neighbor nodes and the isolated nodes grouping across the batches.

6. The method of claim 1, wherein the determining the collective neighbor compensation performance comprises:

accepting, a user-input pair-per source that sets a maximum number of compensating neighbor nodes;

accepting, a user-input prioritize hotspot toggle to prioritize nodes covering hotspots by assigning additional compensating neighbor nodes;

accepting, a hotspot count that provides a number of hotspots for each node; and accepting, a user-input compensation-risk threshold where the additional compensating neighbor nodes are added to compensate until a collective compensation risk is below the compensation-risk threshold.

7. The method of claim 1, wherein the applying the AI to sequence the priority-based sequence of compensating neighbor nodes comprises:

accepting, a geographic coverage map;

accepting, a hotspot count that provides a number of hotspots for each node;

accepting, coverage data for each node from the master node list; and accepting, handover data for each node from the master node list.

8. An apparatus configured to:

receive a master node list at a node filter;

accepting user input single coverage threshold at the node filter;

filter the master node list using the user input single coverage threshold, wherein a node is a network node configured to create, receive, or transmit information, into an isolated nodes grouping and a filtered nodes grouping based on a single-coverage threshold;

apply artificial intelligence (AI) to sequence, for each node in the filtered nodes grouping, a priority-based sequence of compensating neighbor nodes, where the compensating neighbor nodes are prioritized by the AI in terms of compensating capacity;

determine a collective neighbor compensation performance based on an overall compensation provided by the compensating neighbor nodes for a given node that is to be shut down;

distribute each node from the master node list into one or more batches, based on a batch criteria;

schedule the one or more batches for a firmware update of the nodes in each of the one or more batches, wherein nodes within a same batch are shut down together and compensating neighbor nodes provide coverage support during the firmware update; and implement the firmware update for the nodes in each of the one or more batches.

9. The apparatus of claim 8, further configured to:

aggregate the one or more batches with the collective neighbor compensation performance.

10. The apparatus of claim 8, further configured to:

determine a neighbor-compensation performance of each of the one or more batches; and cause the neighbor-compensation performance of each of the one or more batches to display on a user interface.

11. The apparatus of claim 9, further configured to:

determine an overall neighbor-compensation performance the one or more batches; and cause the overall neighbor-compensation performance of each batch to display on a user interface.

12. The apparatus of claim 8, further configured to distribute each node from the master node list into the one or more batches, based on the batch criteria by:

accepting a user-input compensator repeat count that determines a maximum number of nodes a compensating neighbor node is able to support simultaneously;

accepting a user-input compensator repeat priority that determines an impact ratio of compensator repetition in an overall neighbor-compensation performance; and accepting a user-toggle switch for a uniform batch distribution, which is used to ensure near uniform distribution of the compensating neighbor nodes and the isolated nodes grouping across the batches.

13. The apparatus of claim 8, further configured to determine the collective neighbor compensation performance by:

accepting a user-input pair-per source that sets a maximum number of compensating neighbor nodes;

accepting a user-input prioritize hotspot toggle to prioritize nodes covering hotspots by assigning additional compensating neighbor nodes;

accepting a hotspot count that provides a number of hotspots for each node; and accepting a user-input compensation-risk threshold where the additional compensating neighbor nodes are added to compensate until a collective compensation risk is below the compensation-risk threshold.

14. The apparatus of claim 8, further configured to apply the AI to sequence the priority-based sequence of compensating neighbor nodes by:

accepting a geographic coverage map;

accepting a hotspot count that provides a number of hotspots for each node;

accepting coverage data for each node from the master node list; and accepting handover data for each node from the master node list.

15. A non-transitory computer-readable media having computer-readable instructions stored thereon, which when executed performs operations to:

receive a master node list at a node filter;

accepting user input single coverage threshold at the node filter;

filter the master node list using the user input single coverage threshold, wherein a node is a network node configured to create, receive, or transmit information, into an isolated nodes grouping and a filtered nodes grouping based on a single-coverage threshold;

apply artificial intelligence (AI) to sequence, for each node in the filtered nodes grouping, a priority-based sequence of compensating neighbor nodes, where the compensating neighbor nodes are prioritized by the AI in terms of compensating capacity;

determine a collective neighbor compensation performance based on an overall compensation provided by the compensating neighbor nodes for a given node that is to be shut down;

distribute each node from the master node list into one or more batches, based on a batch criteria;

schedule the one or more batches for a firmware update of the nodes in each of the one or more batches, wherein nodes within a same batch are shut down together and compensating neighbor nodes provide coverage support during the firmware update; and implement the firmware update for the nodes in each of the one or more batches.

16. The non-transitory computer-readable media of claim 15, further configured to:

aggregate the one or more batches with the collective neighbor compensation performance.

17. The non-transitory computer-readable media of claim 15, further configured to:

determine a neighbor-compensation performance of each of the one or more batches; and cause the neighbor-compensation performance of each of the one or more batches to display on a user interface.

18. The non-transitory computer-readable media of claim 15, further configured to:

determine an overall neighbor-compensation performance the one or more batches; and cause the overall neighbor-compensation performance of each batch to display on a user interface.

19. The non-transitory computer-readable media of claim 15, further configured to distribute each node from the master node list into the one or more batches, based on the batch criteria by:

accepting a user-input compensator repeat count that determines a maximum number of nodes a compensating neighbor node is able to support simultaneously;

accepting a user-input compensator repeat priority that determines an impact ratio of compensator repetition in an overall neighbor-compensation performance; and accepting a user-toggle switch for a uniform batch distribution, which is used to ensure near uniform distribution of the compensating neighbor nodes and the isolated nodes grouping across the batches.

20. The non-transitory computer-readable media of claim 15, further configured to determine the collective neighbor compensation performance by:

accepting a user-input pair-per source that sets a maximum number of compensating neighbor nodes;

accepting a user-input prioritize hotspot toggle to prioritize nodes covering hotspots by assigning additional compensating neighbor nodes;

accepting a hotspot count that provides a number of hotspots for each node; and accepting a user-input compensation-risk threshold where the additional compensating neighbor nodes are added to compensate until a collective compensation risk is below the compensation-risk threshold.

* * * * *